US010843812B2

(12) United States Patent
Ballocchi et al.

(10) Patent No.: US 10,843,812 B2
(45) Date of Patent: Nov. 24, 2020

(54) FIBRE-REINFORCED COMPONENTS INCLUDING NANOSTRUCTURES

(71) Applicants: SHORT BROTHERS PLC, Belfast (GB); UNIVERSITY OF SURREY, Surrey (GB)

(72) Inventors: Paolo Ballocchi, Newcastle (GB); Philip Jenkins, Antrim (GB); Ian Hamerton, Hampshire (GB); Ravi Silva, Surrey (GB); Thomas Pozegic, Lancashire (GB)

(73) Assignees: SHORT BROTHERS PLC, Belfast (GB); UNIVERSITY OF SURREY, Surrey (GB)

( * ) Notice: Subject to any disclaimer, the term of this patent is extended or adjusted under 35 U.S.C. 154(b) by 661 days.

(21) Appl. No.: 15/533,500

(22) PCT Filed: Dec. 8, 2015

(86) PCT No.: PCT/GB2015/053759
§ 371 (c)(1),
(2) Date: Jun. 6, 2017

(87) PCT Pub. No.: WO2016/092293
PCT Pub. Date: Jun. 16, 2016

(65) Prior Publication Data
US 2018/0265217 A1    Sep. 20, 2018

(30) Foreign Application Priority Data
Dec. 9, 2014   (GB) .................................. 1421827.5

(51) Int. Cl.
*B64D 45/02*        (2006.01)
*B29C 70/08*        (2006.01)
(Continued)

(52) U.S. Cl.
CPC ............ *B64D 45/02* (2013.01); *B29C 70/081* (2013.01); *B32B 5/02* (2013.01); *B32B 5/26* (2013.01);
(Continued)

(58) Field of Classification Search
CPC . C03C 13/00; B29C 70/081; B32B 2262/101; B32B 2262/106; B32B 5/02;
(Continued)

(56) References Cited

U.S. PATENT DOCUMENTS 8,146,861 B2    4/2012   Lengsfeld
8,263,843 B2    9/2012   Kim
(Continued)

FOREIGN PATENT DOCUMENTS

CN        1806344 A      7/2006
CN      102199872 A      9/2011
(Continued)

OTHER PUBLICATIONS

British Search Report for corresponding application GB1421827.5; Report dated May 18, 2015.
(Continued)

*Primary Examiner* — Camie S Thompson
(74) *Attorney, Agent, or Firm* — Cantor Colburn LLP

(57) ABSTRACT

Components having fibre-reinforced composite structures are disclosed. The component comprises a plurality of structural fibres embedded in a cured matrix material and a plurality of nanostructures such as carbon nanotubes extending from one or more of the structural fibres. In some embodiments a density of the nanostructures is at least $10^7$ nanostructures per $cm^2$ of surface area of the one or more structural fibres. In some embodiments, the nanostructures extend from an outer fibre proximal to an outer surface of the component but not from an inner fibre distal from the outer
(Continued)

surface. In some embodiments the one or more structural fibres from which the nanostructures extend are free of a sizing agent.

19 Claims, 16 Drawing Sheets

(51) Int. Cl.
 *B32B 5/02*  (2006.01)
 *B32B 5/26*  (2006.01)
 *B32B 7/08*  (2019.01)
 *C08J 5/00*  (2006.01)
 *C08J 5/06*  (2006.01)
 *B64C 1/06*  (2006.01)
 *B64C 1/12*  (2006.01)

(52) U.S. Cl.
 CPC .............. *B32B 7/08* (2013.01); *B64C 1/06* (2013.01); *B64C 1/12* (2013.01); *C08J 5/005* (2013.01); *C08J 5/06* (2013.01); *B32B 2250/20* (2013.01); *B32B 2255/02* (2013.01); *B32B 2255/20* (2013.01); *B32B 2260/023* (2013.01); *B32B 2260/046* (2013.01); *B32B 2262/101* (2013.01); *B32B 2262/106* (2013.01); *B32B 2307/202* (2013.01); *B32B 2307/302* (2013.01); *B32B 2307/50* (2013.01); *B32B 2605/00* (2013.01); *B32B 2605/18* (2013.01); *Y02T 50/43* (2013.01)

(58) Field of Classification Search
 CPC ... B82Y 30/00; B82Y 40/00; C08K 2201/011; C08K 7/24; Y10T 428/2918; C08J 5/06; D06M 11/74; D06M 2101/40; H01G 11/26; H01G 11/36; H01G 11/40; Y02T 50/43
 USPC ............ 264/108; 423/447.1, 460; 428/292.1, 428/323, 367; 57/200; 977/700, 742
 See application file for complete search history.

(56) References Cited

U.S. PATENT DOCUMENTS

| | | | |
|---|---|---|---|
| 8,337,979 B2 | 12/2012 | Wardle | |
| 8,815,341 B2 | 8/2014 | Malet | |
| 2007/0128960 A1 | 6/2007 | Ghasemi | |
| 2009/0181239 A1 | 7/2009 | Fan | |
| 2010/0155527 A1 | 6/2010 | Maganas | |
| 2010/0271253 A1* | 10/2010 | Shah ........................ | H01B 1/18 342/2 |
| 2011/0124253 A1* | 5/2011 | Shah ..................... | B82Y 30/00 442/60 |
| 2011/0168083 A1 | 7/2011 | Shah | |
| 2011/0186775 A1* | 8/2011 | Shah ...................... | C08L 25/02 252/182.32 |
| 2013/0028744 A1 | 1/2013 | Nordin | |
| 2013/0288036 A1 | 10/2013 | Schulze | |
| 2014/0356613 A1 | 12/2014 | Weisenberger | |

FOREIGN PATENT DOCUMENTS

| | | |
|---|---|---|
| EP | 2578651 A2 | 4/2013 |
| WO | 2008054409 A2 | 5/2008 |
| WO | 2011087411 A1 | 7/2011 |
| WO | 2014065718 A1 | 5/2014 |

OTHER PUBLICATIONS

International Search Report for corresponding application PCT/GB2015/053759 filed Dec. 8, 2015; dated Mar. 16, 2016.
T.R. Pozegic, "Low temperature growth of carbon nanotubes on carbon fibre to create a highly networked fuzzy fibre reinforced composite with superior electrical conductivity", Carbon 74 (2014) 319-328.
Written Opinion of the International Search Authority for corresponding application PCT/GB2015/053759 filed Dec. 8, 2015; dated Mar. 16, 2016.
Chinese office action for corresponding application 201580066439.7; Report dated Dec. 21, 2018.

* cited by examiner

FIBRE-REINFORCED COMPONENTS INCLUDING NANOSTRUCTURES

TECHNICAL FIELD

The disclosure relates generally to fibre-reinforced composite materials for civil aviation applications, and more particularly to composite materials comprising structural fibres having nanostructures such as carbon nanotubes extending therefrom. This application claims priority from GB application no. 1421827.5 filed 9 Dec. 2014.

BACKGROUND OF THE ART

Fibre-reinforced composite materials are becoming more widely used in the aerospace industry due mainly to their advantageous properties such as strength-to-weight ratio, fatigue resistance, reduced part count and so on. However, one important issue with fibre-reinforced composite materials is their relatively low electrical conductivity in comparison with traditional metallic materials.

When a metallic structure for air aircraft (typically made of an aluminium alloy) is manufactured, the electrical conductivity is inherently built into the component. However, this is not the case for a typical fibre-reinforced composite material. Accordingly, solutions have been implemented to increase the electrical conductivity of such components to, for example, provide adequate electro-static discharge (ESD), electro-magnetic interference (EMI) shielding and lightning strike protection (LSP). For composite wings, one typical solution to address this concern has been to add an expanded metal mesh on outside layers of fibre-reinforced composite components. However, this solution can have an adverse impact on weight, top-coat paint adhesion, manufacturing complexity and cost.

Improvement in is therefore desirable.

SUMMARY

In one aspect, the disclosure describes a civil aviation component having a fibre-reinforced composite structure. The component comprises:

a plurality of structural fibres embedded in a cured matrix material; and a plurality of nanostructures extending from one or more of the structural fibres, a density of the nanostructures being at least about $10^7$ nanostructures per $cm^2$ of area of a surface of the one or more structural fibres.

The density of nanostructures extending from the one or more structural fibres may be between about $10^9$ and about $10^{11}$ nanostructures per $cm^2$ of surface area.

The nanostructures may comprise carbon nanotubes.

The one or more structural fibres may be free of a sizing agent.

The component may comprise an outer surface where the plurality of structural fibres may comprise an outer fibre proximal to the outer surface and an inner fibre distal from the outer surface, and the nanostructures may extend from the outer fibre but not from the inner fibre.

The one or more structural fibres may be part of a fabric ply and the nanostructures may extend only from one side of the fabric ply.

The structural fibres may comprise an outer fabric ply proximate an outer surface of the component and an inner fabric ply distal from the outer surface of the component.

The nanostructures may extend only from the outer fabric ply.

The nanostructures may extend from only an outer side of the outer fabric ply.

The nanostructures may extend from both the outer fabric ply and the inner fabric ply.

The nanostructures may be disposed between the outer fabric ply and the inner fabric ply.

The one or more structural fibres may be part of a fabric ply and the nanostructures form at least 1% of the mass of the fabric ply.

The matrix material may be doped with graphene.

The density of the nanostructures may be non-uniform along a length or width of the component.

In another aspect, the disclosure describes an aircraft comprising the component as disclosed herein.

In another aspect, the disclosure describes an aircraft wing skin comprising the component as disclosed herein.

An aircraft wing skin wherein the density of the nanostructures at one location on the wing skin is higher than in another location on the wing skin.

In another aspect, the disclosure describes a civil aviation component having a fibre-reinforced composite structure. The component comprises:

a plurality of structural fibres embedded in a cured matrix material, the plurality of structural fibres comprising an outer fibre proximal to an outer surface of the component and an inner fibre distal from the outer surface; and a plurality of nanostructures extending from the outer fibre and not from the inner fibre.

The outer fibre may be part of an outer fabric ply and the inner fibre may be part of an inner fabric ply. The nanostructures may extend from only one side of the outer fabric ply.

The nanostructures may extend from only an outer side of the outer fabric ply.

The outer fibre may have an outer side facing the outer surface of the component and an inner side opposite the outer side. The nanostructures may extend from the outer side of the outer fibre and not from the inner side of the outer fibre.

The outer fibre may be part of an outer fabric ply.

The outer fabric ply may have an outer side facing the outer surface of the component and an opposite inner side. The nanostructures may extend from the outer side of the outer fabric ply and not from the inner side of the outer fabric ply.

The outer fabric ply may have an outer side facing the outer surface of the component and an opposite inner side. The nanostructures may extend from the outer side of the outer fabric ply and from the inner side of the outer fabric ply.

The outer fibre may be free of a sizing agent.

A density of nanostructures extending from the structural fibre may be at least $10^7$ nanostructures per $cm^2$ of surface area of structural fibre.

The nanostructures may comprise carbon nanotubes.

The outer fibre may be part of a fabric ply and the nanostructures may form at least 1% of the mass of the fabric ply.

The matrix material may be doped with graphene.

In another aspect, the disclosure describes an aircraft comprising the component as disclosed herein.

In another aspect, the disclosure describes an aircraft wing skin comprising the component as disclosed herein.

In another aspect, the disclosure describes a civil aviation component having a fibre-reinforced composite structure. The component comprises:

a plurality of structural fibres embedded in a cured matrix material; and a plurality of nanostructures extending from one or more of the structural fibres, the one or more structural fibres from which the nanostructures extend being free of a sizing agent.

The component may comprise an outer surface where the plurality of structural fibres may comprise an outer fibre proximal to the outer surface and an inner fibre distal from the outer surface, and the nanostructures may extend from the outer fibre but not from the inner fibre.

One or more of the structural fibres may be part of a fabric ply and the nanostructures may extend only from one side of the fabric ply.

The structural fibres may comprise an outer fabric ply proximate an outer surface of the component and an inner fabric ply distal from the outer surface of the component.

The nanostructures may extend from the outer fabric ply but not from the inner fabric ply.

The nanostructures may extend from only an outer side of the outer fabric ply.

The nanostructures may extend from the outer fabric ply and from the inner fabric ply.

The nanostructures may be disposed between the outer fabric ply and the inner fabric ply.

Each of the one or more structural fibres may have a first side and a second side opposite the first side. The nanostructures may extend from the first side and not from the second side.

The nanostructures may comprise carbon nanotubes.

A density of nanostructures extending from the one or more structural fibres may be at least $10^7$ nanostructures per $cm^2$ of surface area of structural fibre.

The one or more structural fibres may be part of a fabric ply and the nanostructures may form at least 1% of the mass of the fabric ply.

The matrix material may be doped with graphene.

In another aspect, the disclosure describes an aircraft comprising one or more of the components as disclosed herein.

In another aspect, the disclosure describes an aircraft wing skin comprising one or more of the components as disclosed herein. The density of the nanostructures at one location on the wing skin may be higher than in another location on the wing skin.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

The present disclosure relates to aerospace components comprising fibre-reinforced composite materials. Such components may be suitable for use in civil aviation, military aviation, missiles, rockets and/or satellite applications. For example, the components disclosed herein may comprise or be part of aircraft components such as wing skins, fuselages, empennages, engine nacelles, horizontal stabilizers, vertical stabilizers, flight control surfaces and/or other structural and non-structural components such as frames, stringers, ribs, spars, brackets, wing fairings or belly fairings, etc. In some embodiments, aspects of the present disclosure may contribute toward improving the electrical conductivity (and hence ESD, EMI shielding and LSP) of fibre-reinforced composite materials through the use of electrically conductive nanostructures such as carbon nanotubes (CNTs) extending from structural fibres. Accordingly, in some embodiments, components disclosed herein may include aircraft components that are susceptible to lightning strike for example. In some embodiments, the addition of nanostructures to the fibre-reinforced materials may also improve the thermal conductivity, one or more mechanical properties (e.g., toughness) and/or interfacial adhesion of the materials.

In cases where some specific electrical conductivity and thermal characteristics are achieved, such component could potentially be used in a region of an aircraft that requires de-icing or anti-icing functionalities.

In some embodiments, the improvement in electrical conductivity provided by the methods and components disclosed herein may facilitate the structural health monitoring of such components during operation. For example, such materials, may allow for their electrical resistance to be monitored during use to provide an indication of the strain (and hence stress) that is experienced by the material.

Even though the following disclosure is mainly directed toward aerospace components for civil aviation, it is understood that various aspects of the disclosure may be equally applicable to fibre-reinforced composite materials used in other applications including transport (e.g., trains, busses, ships, watercraft), automotive, defense and other applications.

Figure 1:
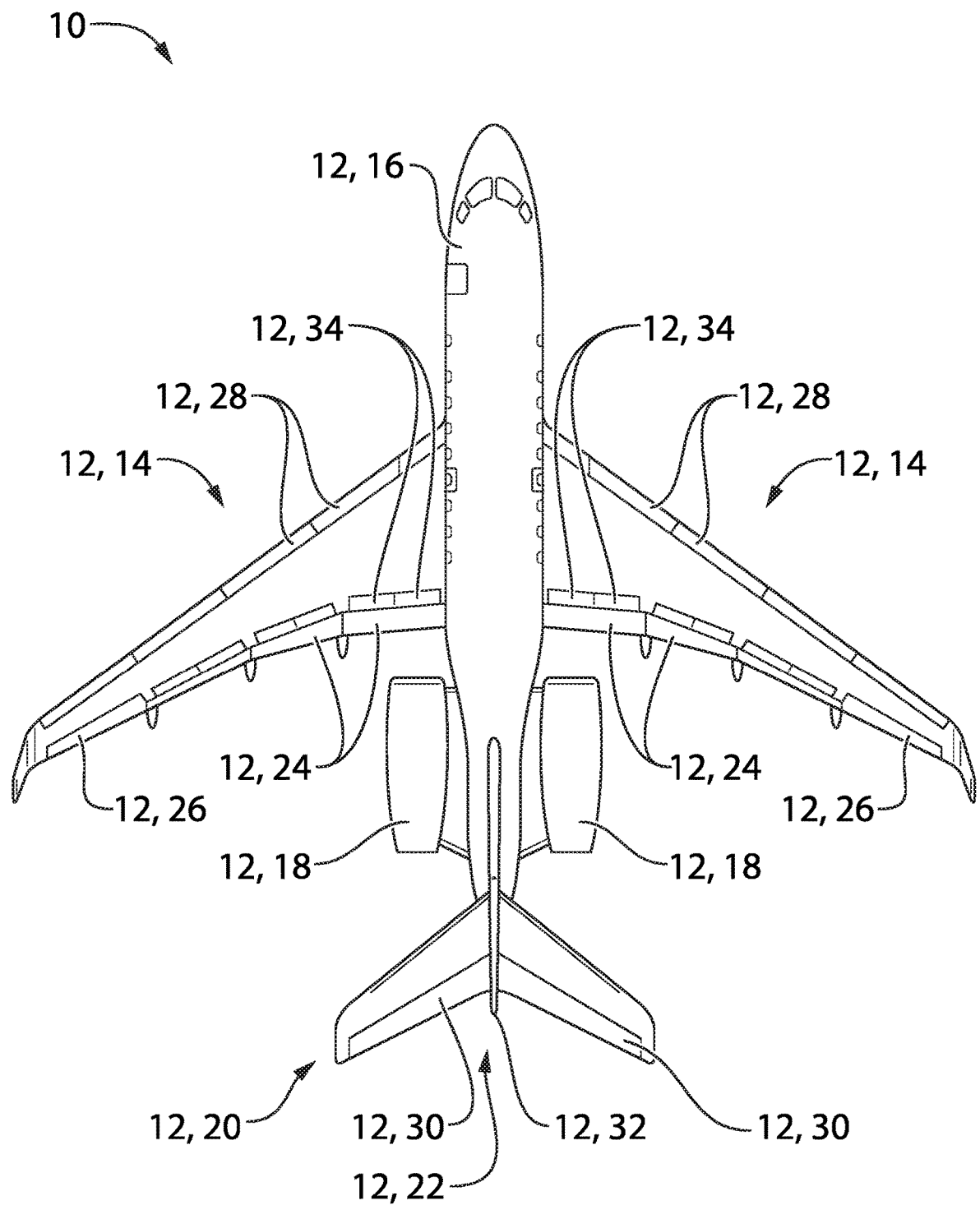
FIG. 1 shows a top plan view of an exemplary aircraft comprising one or more fibre-reinforced components according to the present disclosure.

FIG. 1 shows a top plan view of an exemplary aircraft 10 comprising one or more fibre-reinforced components 12 having nanostructures according to the present disclosure. Component 12 may be an aerospace component such as a civil aviation component for example. Aircraft 10 may be any aircraft such as corporate, private, commercial or any other type of aircraft including passenger aircraft suitable for civil aviation or unmanned aircraft. For example, aircraft 10 may be a narrow-body, twin-engine jet airliner. Aircraft 10 may be a fixed-wing aircraft or a rotary-wing aircraft. Component 12 may comprise or be part of any suitable part of aircraft 10 that may comprise fibre-reinforced composite material. For example, component 12 may comprise or may be part of one or more of: wing 14 (e.g., wing skin), fuselage 16, nacelle 18, horizontal stabilizer 20, vertical stabilizer 22, flap 24, aileron 26, slat 28, elevator 30, rudder 32 and spoiler 34. Component 12 may also comprise or be part of internal structural elements of aircraft 10 such as frames, stringers, ribs and spars.

Figure 2:
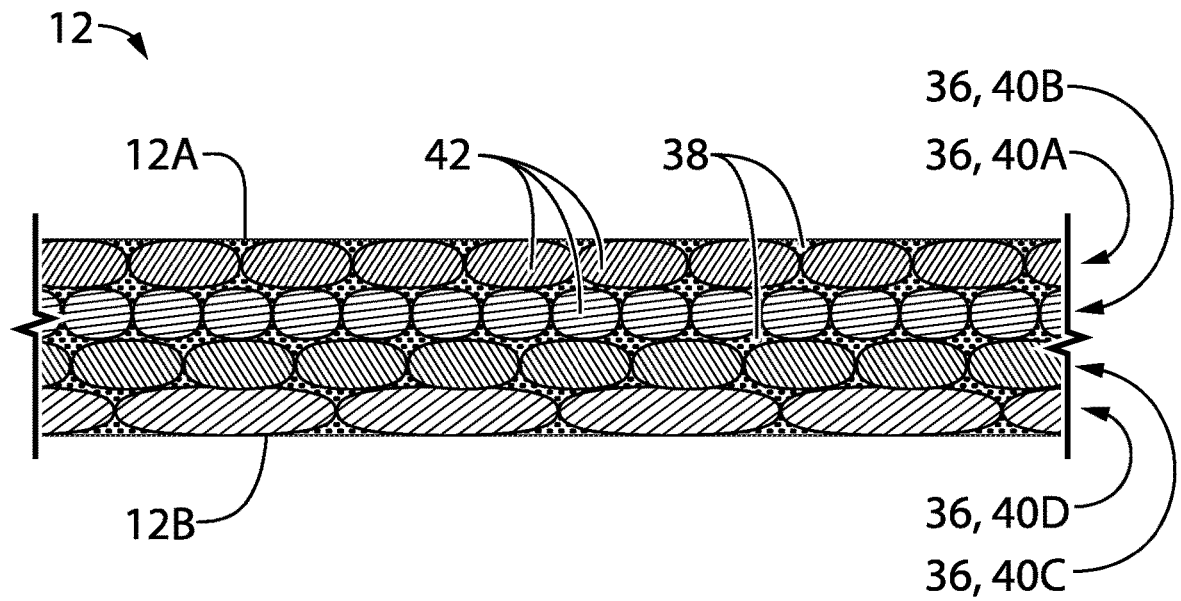
FIG. 2 is a schematic partial cross-sectional view of an exemplary component of FIG. 1.

FIG. 2 is an exemplary schematic cross-sectional (through-thickness) view of component 12. Component 12 may comprise a plurality of structural fibres 36 embedded in a cured matrix material 38. Structural fibres 36 may be part of one or more fabric plies 40A-40D sometimes also referred to as cloths that are overlaid inside component 12 and embedded in cured matrix material 38. Each fabric ply 40A-40D may comprise one or more tows 42 made up of structural fibres 36. In some embodiments, each tow 42 may comprise about 1,000-12,000 structural fibres 36. In some embodiments, fabric plies 40A-40D may comprise woven and/or non-crimp fabric. Structural fibres 36 may comprise carbon fibres or other material(s) suitable for aerospace applications and that may be electrically conductive. In some embodiments, structural fibres 36 may comprise one or more intermediate-modulus carbon fibres having a cross-sectional diameter of about 5 µm. In some embodiments, structural fibres 36 may comprise one or more high-strength carbon fibres having a cross-sectional diameter of about 7 µm. In some embodiments, structural fibres 36 may comprise one or more E-glass fibres having a cross-sectional diameter of about 12 µm.

Matrix material 38 may be of any known or other type suitable for producing fibre-reinforced structures for aerospace applications. In various embodiments, matrix material 38 may comprise polyester, vinyl-ester, epoxy, benzoxazine and/or Bismaleimide (BMI) resin systems. Some matrix materials 38 having a good fire, smoke and toxicity (FST) properties may be suitable for "in cabin" aerospace and transportation applications. For example, depending on the specific application and requirements, matrix material 38 may comprise one of the following products: product name T-PRIME 160 sold under the trade name GURIT; product number 337 sold under the trade name EPO-TEK; product name TOOLFUSION 3 sold under the trade name TYGAVAC; product name RENLAM LY120 sold under the trade name HUNTSMAN; product names ARALDITE LY1564, ARALDITE FST 40002, ARALDITE FST 40003 and ARA-DUR 2594 sold under the trade name HUNTSMAN; product names CYCOM 890 and CYCOM 5250-4 sold under the trade name CYTEK; product names RTM 6 and RTM 651 sold under the trade name HEXCEL; product name EPON 862 sold under the trade name MOMENTIVE; product names LOCTITE BZ 9120 and LOCTITE BZ 9121 sold under the trade name HENKEL; and, product name BMI-1 sold under the trade name RAPTOR RESINS. In some embodiments, matrix material 38 may comprise a graphene-doped resin which may be suitable for some applications and may further improve the electrical conductivity of at least part of component 12.

Component 12 may comprise one or more surfaces 12A, 12B. For example, surface 12A may be an outer surface that may be facing or exposed to the environment outside of aircraft 10 and susceptible to lightning strike. Surface 12B may be an inner surface that may be opposite outer surface 12A and that may face the inside of aircraft 10. Accordingly, one or more of structural fibres 36 may be proximal to outer surface 12A by being part of fabric ply 40A for example. Also, one or more of structural fibres 36 may be distal to outer surface 12 by being part of fabric ply 40D for example. As explained below, one or more of structural fibres 36 may have a plurality of nanostructures 44 (shown in FIGS. 4A, 4B, 5A and 5B) extending therefrom to improve the electrical conductivity of at least part of component 12. Structural fibres 36 having such nanostructures 44 extending therefrom may also be referred to as "fuzzy" fibres.

Figure 3:
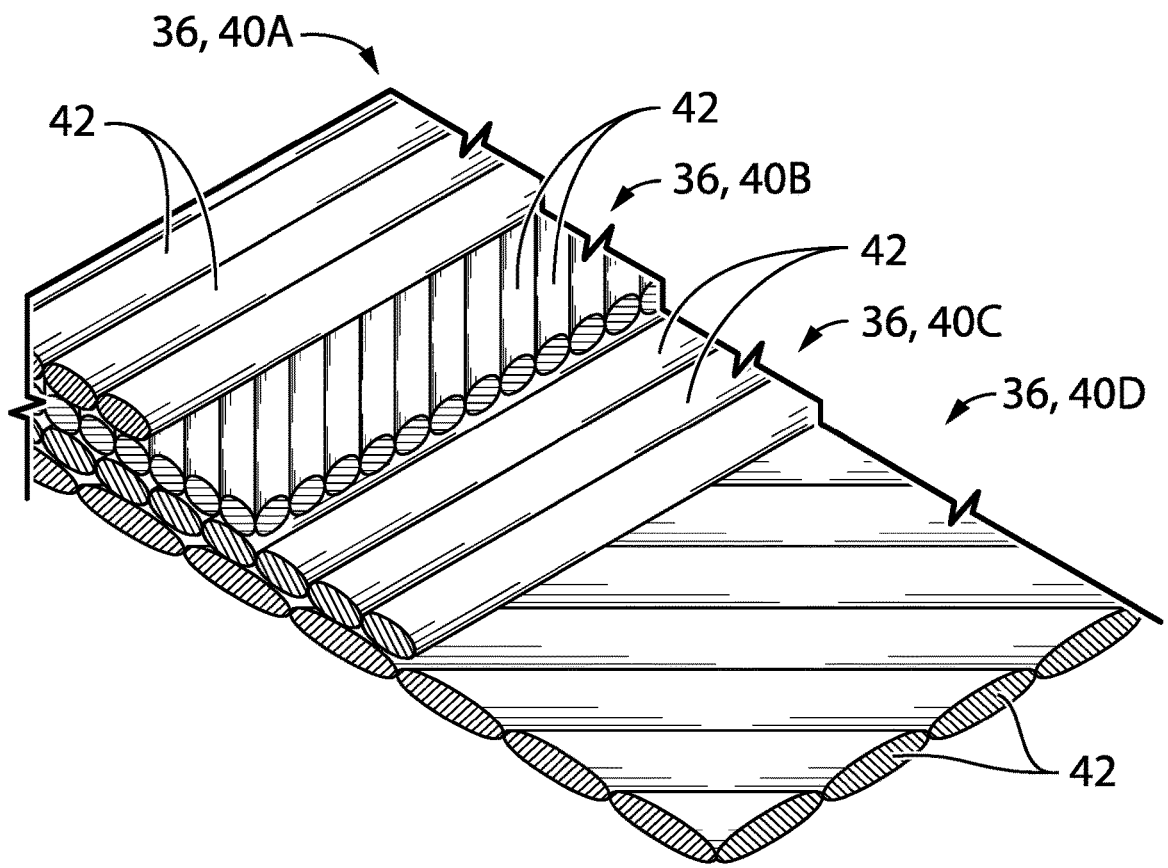
FIG. 3 is a schematic partial axonometric view of exemplary fabric plies that are part of the component of FIG. 1.

FIG. 3 is a schematic axonometric view of exemplary dry fabric plies 40A-40C that may be part of component 12 prior to infusion with matrix material 38. As explained above, fabric plies 40A-40D may comprise non-crimp fabric. Component 12 may comprise additional or fewer fabric plies 40A-40D than those shown herein depending on the application and function of component 12. In various embodiments, tows 42 of adjacent plies 40A-40D may be disposed at different orientations as shown in FIG. 3.

Figure 4A:
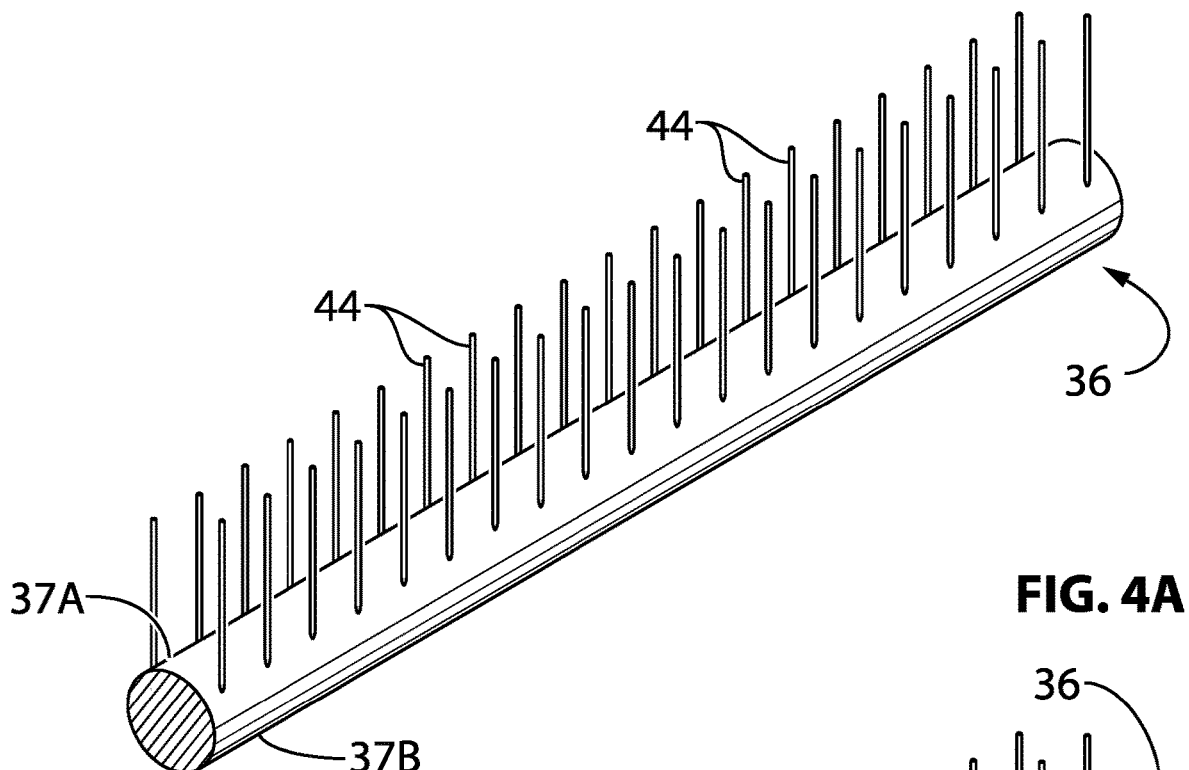
FIG. 4A is a schematic view of an exemplary structural fibre of the component of FIG. 1 with a plurality of nanostructures extending from one side of the structural fibre.
Figure 4B:
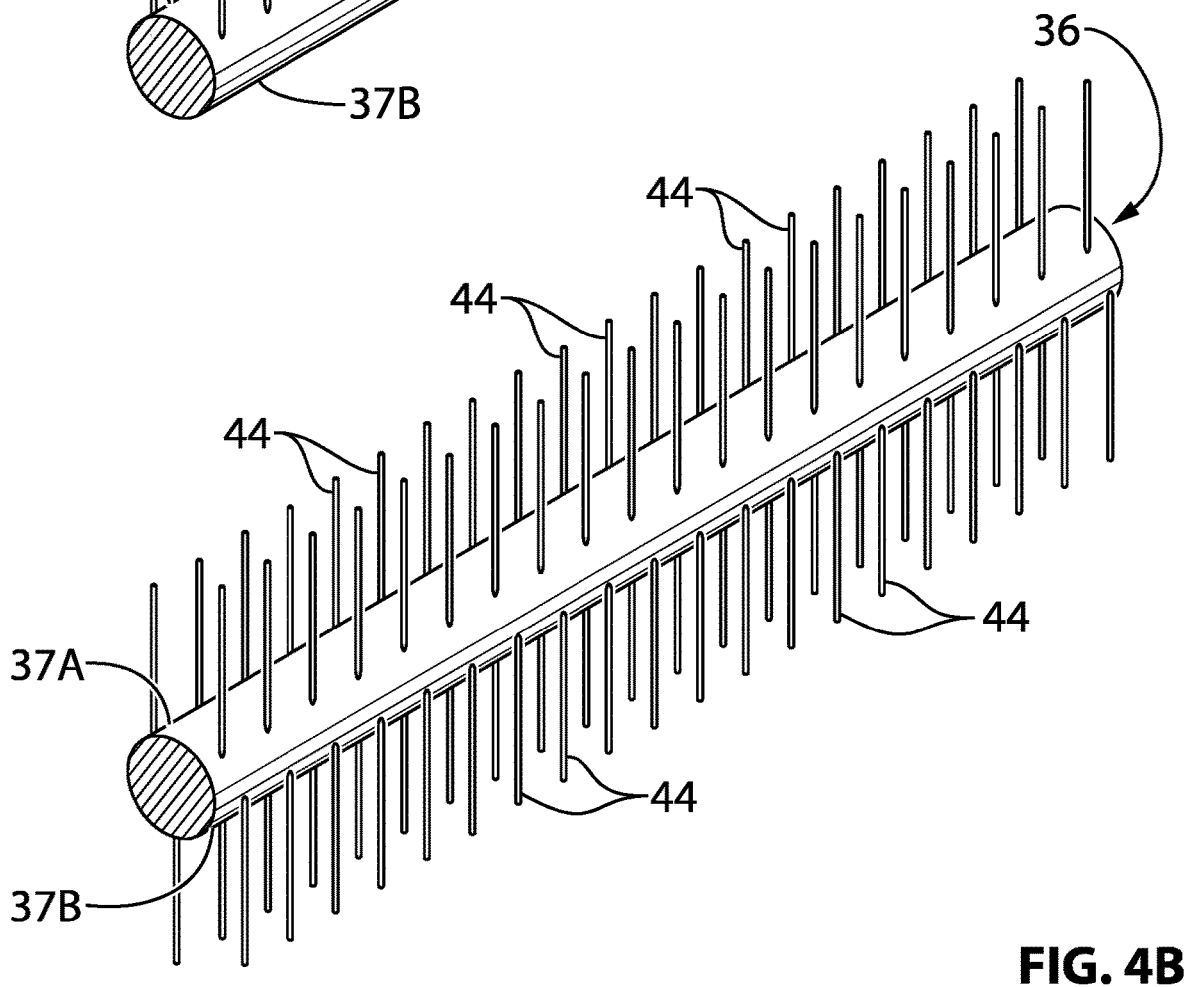
FIG. 4B is a schematic view of another exemplary structural fibre of the component of FIG. 1 with a plurality of nanostructures extending from two sides of the structural fibre.

FIG. 4A is a schematic view of an exemplary structural fibre 36 of component 12 with a plurality of nanostructures 44 (also referred hereinafter as "carbon nanotubes 44" or "CNTs 44") extending from one side 37A of structural fibre 36. FIG. 4B is a schematic view of another exemplary structural fibre 36 of component 12 with a plurality of nanostructures 44 extending from two sides 37A, 37B of structural fibre 36. Nanostructures 44 may be applied to or grown onto part of the circumferential surface of structural fibre 36 using methods described below. In some embodiments, nanostructures 44 may comprise carbon nanotubes or other electrically conductive nanostructures. In some embodiments, nanostructures 44 may comprise multi-walled and/or single-walled carbon nanotubes. Sides 37A, 37B of structural fibre 36 may comprise circumferential halves of the exterior surface of structural fibre 36. In some embodiments, structural fibre 36 may have a cross-sectional profile that is substantially circular. Alternatively, structural fibre 36 may have a cross-sectional profile of another suitable shape. In some embodiments, nanostructures 44 may be bonded to structural fibre 36. In some embodiments, nanostructures 44 may be in electrical contact (e.g., bonded) with structural fibre 36 so as to form an electrical path between nanostructures 44 and structural fibre 36. Accordingly, nanostructures 44 may provide electrical percolation pathways between structural fibres 36.

Depending on the specific application, nanostructures 44 may extend from one side 37A or from two sides 37A and 37B of structural fibre 36. For example, in some application, nanostructures 44 extending from the entire circumference of structural fibre 36 may not be required. For example, in the case where component 12 is a skin of wing 14 of aircraft 10, it may be more important to increase the electrical conductivity near surface 12A (see FIG. 2) of component 12. In some cases, it may be sufficient to have nanostructures 44 extending from only side 37A of structural fibre 36. In some embodiment, side 37A may be an outer side of structural fibre 36 that faces outer surface 12A of component 12 and side 37B may be an inner side of structural fibre 36 that is opposite to side 37A and that accordingly faces away from outer surface 12A of component 12. For example, in case where structural fibre 36 is part of fabric ply 40A, inner side 37B of structural fibre 36 may face toward adjacent fabric ply 40B.

Whether or not nanostructures 44 extend from one or both sides 37A, 37B of structural fibre 36, not all of structural fibres 36 in component 12 may necessarily have nanostructures 44 extending therefrom. For example, in some embodiments, structural fibres 36 that are proximal to outer surface 12A of component 12 may have nanostructures 44 extending therefrom but structural fibres 36 that are distal to surface 12B may not have nanostructures 44 extending therefrom. For example, structural fibres 36 that are part of fabric ply 40A (see FIG. 2) may have nanostructures 44 extending therefrom but structural fibres 36 that are part of fabric plies 40B, 40C and/or 40D may not have nanostructures 44 extending therefrom. In some embodiments, it may be desirable to have nanostructures 44 extending from fabric plies 40A and 40B that are disposed closer to outer surface 12A.

Alternatively, depending on the specific requirements, it may be desirable to have most or all of structural fibres 36 in component 12 or in a fabric ply 40 having nanostructures 44 extending therefrom. In some embodiments, it may be desirable to have at least some structural fibres 36 in each fabric ply 40A-40D having nanostructures 44 extending therefrom to improve through-thickness electrical conductivity.

Figure 5A:
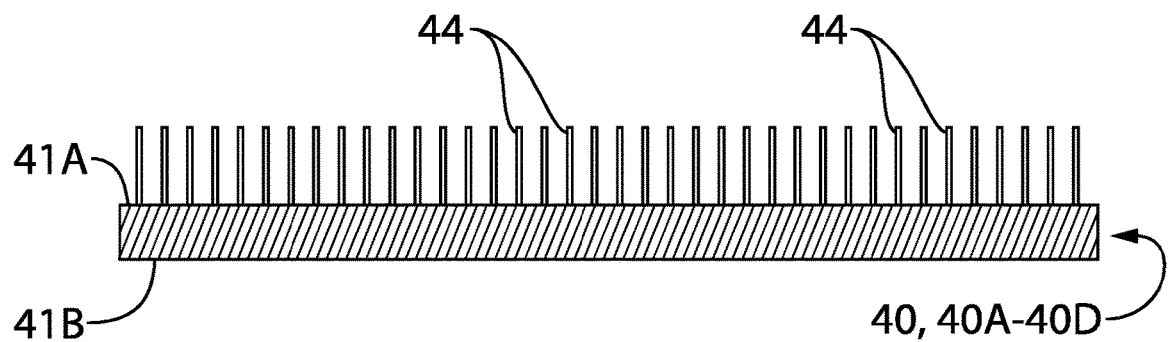
FIG. 5A is a schematic partial cross-sectional view of an exemplary fabric ply of the component of FIG. 1 with a plurality of nanostructures extending from one side of the fabric ply.
Figure 5B:
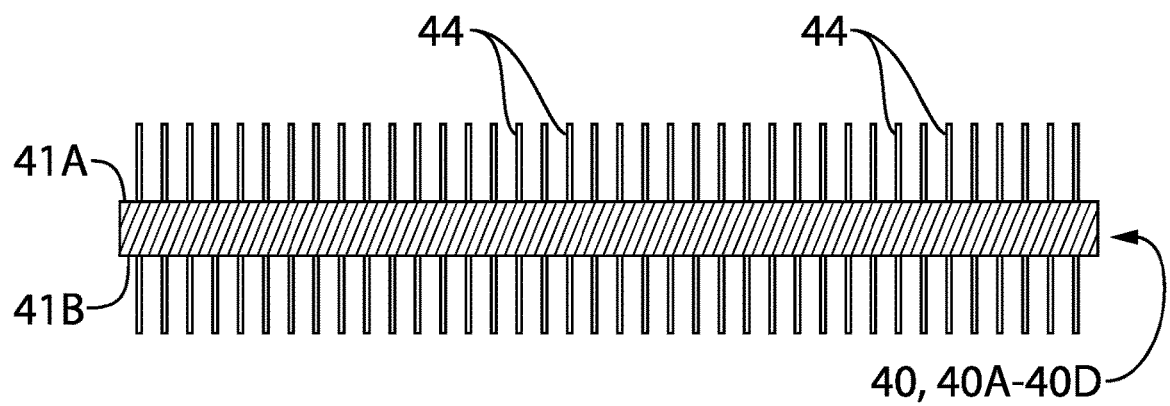
FIG. 5B is a schematic partial cross-sectional view of another exemplary fabric ply of the component of FIG. 1 with a plurality of nanostructures extending from two sides of the fabric ply.

FIG. 5A is a schematic cross-sectional view of an exemplary fabric ply 40 of component 12 with a plurality of nanostructures 44 extending from one side 41A of fabric ply 40. FIG. 5B is a schematic cross-sectional view of another exemplary fabric ply 40 of component 12 with a plurality of nanostructures 44 extending from two sides 41A, 41B of fabric ply 40. It should be understood that fabric plies 40 shown in FIGS. 5A and 5B are intended to illustrate any one of fabric plies 40A-40D since not all of fabric plies 40A-40D may necessarily have nanostructures 44 extending therefrom. The methods disclosed herein for growing nanostructures 44 onto structural fibres 36 may be used to grow nanostructures 44 onto individual structural fibres 36 or onto groups of structural fibres 36 such as fabric plies 40A-40D for example. Accordingly, one or more fabric plies 40A-40D of component 12 may have nanostructures 44 extending from one or both sides 41A, 41B thereof. As explained above, depending on the specific requirements for component 12, one or more fabric plies 40A-40D may have nanostructures 44 extending from one or more sides 41A-41B thereof.

For example, in some embodiments, one or more outer structural fibres 36 may be part of outer fabric ply 40A and one or more inner structural fibres 36 may be part of inner fabric ply 40B-40D where nanostructures 44 may extend from one or both sides 41A, 41B of outer fabric ply 40A. For example, side 41A of fabric ply 40 may face toward outer surface 12A of component 12 and opposite side 41B may face away from outer surface 12A of component 12.

The previous paragraphs explain various combinations of nanostructures 44 extending from one or more structural fibres 36 at different locations across the thickness of component 12. However, it should be noted that different amounts of nanostructures 44 could be present in different locations across the width and/or length of component 12 depending on where the material properties (i.e., increased electrical conductivity and/or increased thermal conductivity) achieved through the use of such nanostructures 44 are desired. In other words, the amount of nanostructures 44 in component 12 does not need to be substantially uniform across the thickness, width and/or length of component 12. In the case of component 12 being part of a wing 14 of aircraft 10 for example, the amount of nanostructures 44 near a fastener, a tip of wing 14, near engine nacelle 18 and/or other critical area(s) may be greater than in other locations within component 12. In some embodiments, component 12 may comprise alternating regions (e.g., bands) of high amounts of nanostructures 44 and regions (e.g., bands) of low (or no) amounts of nanostructures 44.

In some embodiments, one or more of structural fibres 36 of component 12 may be free of a sizing agent. A polymer sizing agent is typically applied to structural fibres to improve the handleability of carbon fibre fabrics. Sizing agents that are typically used on structural fibres of epoxy matrix composites may include an epoxy polymer sizing, polyhydroxyether, polyphenyleneoxide, copolymers of styrene and maleic anhydride (SMA), a block copolymer of SMA with isoprene, polysulfone, polybutadiene, silicone, a carboxy-terminated polybutadiene, and a copolymer of ethylene and acrylic acid. Sizing agents that are typically used on structural fibres of thermoplastic-matrix composites include polyimides and polyimide-PES blends. Such sizing agents, are typically substantially not electrically conductive and therefore may result in having an electrical insulator effect around structural fibres 36. The methods disclosed herein for growing electrically conductive nanostructures 44 on structural fibres 36 may also cause such sizing agent(s) to be removed (e.g., burned off) from structural fibres 36, which may be electrically conductive. As explained below, the removal of such sizing agent(s) may be conducted before the growth of nanostructures 44 on structural fibres 36. Accordingly, the lack of electrically insulating sizing agent on structural fibres 36 may improve the electrical conductivity of at least part of component 12.

Another factor that may affect the electrical conductivity of component 12 is the quality and density of nanostructures 44 that extend from structural fibres 36. For example, the quality and density of carbon nanotube forests grown in accordance with the methods disclosed herein may be superior to carbon nanotubes grown using other methods. Accordingly, the electrical conductivity and/or other material properties of at least part of component 12 may be improved. For example, in some embodiments, the density of nanostructures 44 extending from one or more structural fibres 36 may be between about $10^7$ and about $10^{12}$ nanostructures 44 (e.g., CNTs) per $cm^2$ of surface area of structural fibre(s) 36. In some embodiments, the density of nanostructures 44 extending from one or more structural fibres 36 may be between about $10^9$ and about $10^{11}$ nanostructures 44 (e.g, CNTs) per $cm^2$ of surface area of structural fibre(s) 36. In some embodiments, a specific surface area of structural fibre 36 may have nanostructures 44 extending therefrom where the nanostructures 44 cover at least about 50% of that specific surface area.

The size and length (i.e., aspect ratio) of nanostructures 44 may also be varied by changing one or more process parameters of the methods disclosed herein. In some embodiments, the average radius of CNTs 44 extending from structural fibres 36 may be between about 1 nm and about 300 nm. In some embodiments, the average radius of CNTs 44 extending from structural fibres 36 may be between about 10 nm and about 100 nm. In some embodiments, the average length of CNTs 44 extending from structural fibres 36 may be between about 1 μm and about 500 μm. In some embodiments, the average length of CNTs 44 extending from structural fibres 36 may be between about 10 μm to about 50 μm. In some embodiments, the average length of CNTs 44 extending from structural fibres 36 may be between about 50 μm to about 100 μm. In some embodiments, the length of one or more CNTs 44 extending from structural fibres 36 may be up to about 200 μm.

Figure 15:
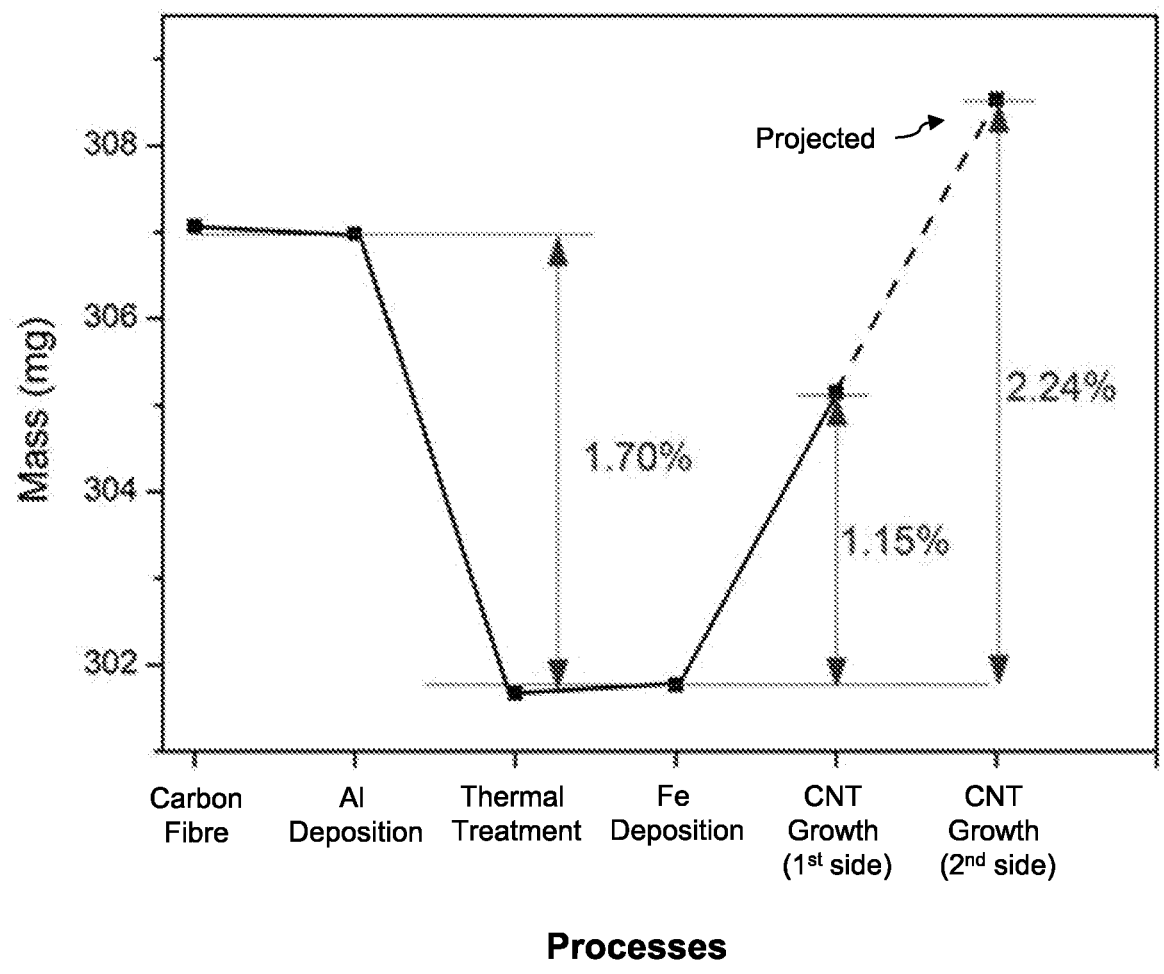
FIG. 15 shows a plot illustrating exemplary changes in mass of a sample of fabric ply 40 as it undergoes various steps associated with a method for growing nanostructures thereon.

In some embodiments, nanostructures 44 grown on one fabric ply 40 in accordance with the present disclosure may form at least 1%, 2%, 3%, 4% or 5% of the mass of the fabric ply 40. In some embodiments, nanostructures 44 grown on two sides of one fabric ply 40 in accordance with the present disclosure may form about 2.5% of the mass of the fabric ply 40. In some embodiments, nanostructures 44 grown on two sides of one fabric ply 40 in accordance with the present disclosure may form about 1.5% of the mass of the fabric ply 40. As shown in FIG. 15, in some embodiments, nanostructures 44 grown on one side of one fabric ply 40 in accordance with the present disclosure may form about 1.15% of the mass of the fabric ply 40, and, nanostructures 44 grown on two sides of one fabric ply 40 in accordance with the present disclosure may form about 2.24% of the mass of the fabric ply 40.

Methods for growing nanostructures 44 on structural fibres 36 may include aspects disclosed in U.S. Patent Application Publication No. 2009/0061217 A1, which is incorporated herein by reference in its entirety. Generally, an exemplary method may comprise applying a catalyst on a first side 41A or 41B of (e.g., carbon fibre) fabric ply 40A-40D and growing one or more nanostructures 44 (e.g., carbon nanotube) therefrom. If nanostructures 44 are desired on both sides 41A and 41B of fabric ply 40A-40D, the method may comprise applying the catalyst on a second side 41A or 41B of fabric ply 40A-40D and growing one or more nanostructures 44 (e.g., carbon nanotube) therefrom. The growing of nanostructures 44 on both sides 41A and 41B may be conducted simultaneously or sequentially. The method may further comprise forming component 12 using one or more fabric plies 40A-40D having nanostructures 44 extending therefrom.

Similarly, with respect to growing nanostructures 44 onto individual structural fibres 36, the method may comprise applying a catalyst on a first side 37A or 37B of structural fibre 36 and growing one or more nanostructures 44 (e.g., CNTs) therefrom. If nanostructures 44 are desired on both sides 37A and 37B of structural fibre 36, the method may comprise applying the catalyst on a second side 37A or 37B of structural fibre 36 and growing one or more nanostructures 44 (e.g., CNTs) therefrom. The growing of nanostructures 44 on both sides 37A and 37B of structural fibre 36 may be conducted simultaneously or sequentially. The method may further comprise forming component 12 using structural fibre(s) 36 having nanostructures 44 extending therefrom.

The catalyst may be applied to structural fibre(s) 36 either by applying the catalyst directly onto fabric ply 40 or by applying the catalyst onto structural fibre(s) 36 before arranging structural fibre(s) 36 into one or more tows 42 and then into one or more fabric plies 40 onto which nanostructures 44 are subsequently grown. Similarly, the catalyst could be applied to one or more tows 42 before such tows 42 are arranged into one or more fabric plies onto which nanostructures are subsequently grown.

The catalyst may comprise a material selected from a group consisting of: copper (Cu), nickel (Ni), ruthenium (Ru), cobalt (Co), iron (Fe), rubidium (Rd), platinum (Pt), iridium (Ir), palladium (Pd), rhodium (Rh), carbides, silver (Ag), gold (Au), manganese (Mn), molybdenum (Mo), chromium (Cr), Tin (Sn), magnesium (Mg), aluminium (Al), silicon carbide (SiC), germanium (Ge), silicon (Si), diamond, steel or a composite of any two or more of the aforementioned materials. In some embodiments, the catalyst may comprise iron (Fe). Any of these catalyst materials may be used on first side 41A and/or second side 41B of fabric ply(ies) 40A-40D, or, on first side 37A and/or second side 37B of structural fibre(s) 36. The application of the catalyst material on structural fibre(s) 36 and/or fabric ply 40A-40D may comprise sputter depositing a suitable material onto structural fibre(s) 36 and/or fabric ply 40A-40D so as to create a catalyst layer thereon. In various embodiments, the catalyst layer may be between 1 nm and 500 nm in thickness. In some embodiments, the catalyst layer may be between 1 nm and 9 nm in thickness.

The method may also comprise providing fabric ply(ies) 40A-40D (first side 41A and/or second side 41B), or, structural fibre(s) 36 (first side 37A and/or second side 37B) with a support layer before the catalyst is deposited. The support layer may comprise copper (Cu), nickel (Ni), ruthenium (Ru), cobalt (Co), iron (Fe), rubidium (Rd), platinum (Pt), iridium (Ir), palladium (Pd), rhodium (Rh), carbides, silver (Ag), gold (Au), manganese (Mn), molybdenum (Mo), chromium (Cr), Tin (Sn), magnesium (Mg), aluminium (Al), silicon carbide (SiC), germanium (Ge), silicon (Si), diamond, steel or a composite of any two or more of the aforementioned materials. In some embodiments, the support layer may comprise aluminium (Al). The application of the support layer on structural fibre(s) 36 and/or fabric ply(ies) 40A-40D may comprise sputter depositing a suitable material thereon. In various embodiments, the support layer may be between 1 nm and 500 nm in thickness. In some embodiments, the support layer may be between 10 nm and 50 nm in thickness.

As explained above, structural fibre(s) 36 and/or fabric ply(ies) 40A-40D may comprise a sizing agent which is removed before growing nanostructures 44. In some embodiments, the sizing agent is removed before the catalyst material is deposited on structural fibre(s) 36 and/or fabric ply(ies) 40A-40D. Optionally, the method may comprise annealing the support layer after it has been deposited onto the sized structural fibre(s) 36 and/or fabric ply(ies) 40A-40D. The step of annealing the support layer may comprise heating the structural fibre(s) 36 and/or fabric ply(ies) 40A-40D to a temperature which is adequate to remove the polymer sizing by burning it off. For example, the structural fibre(s) 36 and/or fabric ply(ies) 40A-40D may be heated to a temperature of between 300° C. and 800° C., to a temperature of between 400° C. and 700° C. and/or to a temperature of between 500° C. and 600° C. for a suitable time. A suitable time may comprise at least 5 minutes, a least 10 minutes and/or at least 15 minutes. Any of the above temperatures may be combined with any of the above suitable times.

The growing of nanostructures 44 (e.g., CNTs) may comprise growing CNTs in a chemical vapour deposition (CVD) system. The process can be performed in any form of CVD system, including thermal CVD (TCVD), plasma enhanced CVD (PECVD) or photothermal CVD (PTCVD). Preferably, PTCVD is used in which optical energy is delivered to one or more carbon fabric plies 40 as infrared radiation, preferably from above the carbon fabric ply 40. For example, infrared (IR) lamps may be used while the carbon fabric sample is placed on a water-cooled chuck (see sample holder 46 shown in FIG. 7) as disclosed in U.S. Patent Application Publication No. 2009/0061217 A1. An upper surface of the carbon fabric ply 40 is heated to a temperature of at least 400° C., 500° C. or at least 600° C. An upper surface of the carbon fabric ply 40 may be heated up to 1100° C. In some embodiments, the bulk of carbon fabric ply 40 may remain at a temperature below 600° C., 470° C. or below 250° C. due to heat removal by conduction or other mechanism(s) via the water-cooled chuck. The cooling of fabric ply 40 may allow for the bulk of a structural fibre 36 to remain at a temperature that does not cause substantial degradation of structural fibre 36 while the outer surface of structural fibre 36 may be heated to a temperature sufficient to permit the growth of nanostructures 44. In other words, the cooling of structural fibre 36 may substantially prevent damage from being caused to structural fibre 36 due to exposure to the relatively high temperatures required for growing nanostructures 44.

The bulk temperature of carbon fabric ply 40 may be monitored using a pyrometer disposed towards a lower surface of carbon fabric ply 40 or a thermocouple placed alongside the sample. The temperature of carbon fabric ply 40 may be mainly controlled by the electrical power supplied to the optical lamps, the gases used and pressure of the gases in the chamber. If the power supplied to the chamber is by another means, this may need to be optimised to couple the correct energy to the system, which will be known to the skilled person. The heat capacities of the gases in the chamber may also play a role in the thermal energy kinetics. The bulk temperature of the carbon fabric ply 40 may be in the range of 250-500° C. with an upper surface temperature of between 350-850° C. In various embodiments, one or more fabric plies 40 may be present in the chamber during any part of the method.

The growth of CNTs 44 may comprise treating the carbon fabric with the catalyst to a bulk temperature of below 470° C. in flowing hydrogen ($H_2$). However, other gases such as argon (Ar), nitrogen ($N_2$), helium (He), ammonia ($NH_3$), etc., may also be used. Plasma-assisted or chemical-based catalyst treatment may also be used. In some embodiments, the flowing $H_2$ may be delivered at between 25-500 sccm (standard cubic centimetres per minute). In some embodiments, the flowing $H_2$ may be delivered at about 200 sccm. This step may be carried out at a pressure between 0.1 Torr and 7600 Torr. In some embodiments, this step may be carried out at a pressure of about 10 Torr. The preheating step may be maintained for about 1-60 minutes, for about 5-15 minutes. In some embodiments, the preheating step may be maintained for about 10 minutes. It will be appreciated that any of the above pressures may be combined with any of the above timings.

The growth of CNTs 44 may also comprise using a carbon feedstock such as acetylene ($C_2H_2$), ethylene ($C_2H_4$), methane ($CH_4$), carbon monoxide (CO), camphor, naphthalene, ferrocene, benzene, ethanol, or any other carbon feedstock. In some embodiments, the growth of CNTs may comprise using $C_2H_2$ as the carbon feedstock. The growth process may be maintained for about 0.1-60 minutes. In some embodiments, the growth process may be maintained for about 2-30 minutes. In some embodiments, the growth process may be maintained for about 15 minutes. The carbon feedstock may be delivered at a rate between about 5-500 sccm. In some embodiments, the carbon feedstock may be delivered at about 50 sccm. This step may be carried out at a pressure between 0.1 Torr and 7600 Torr. In some embodiments, this step may be carried out at a pressure of about 10 Torr. It will be appreciated that any of the above pressures may be combined with any of the above timings.

The density of nanostructures 44 grown on one or more structural fibres 36 may be controlled to some extent by varying process parameters of the methods disclosed herein. For example, adjustments to the catalyst material, reactants, flow sequences, temperature, pressure and other parameters may be used to control the density of the CNTs 44 grown. In various embodiments, the methods disclosed herein may be used to produce a dense array of closely-spaced CNTs resembling a carpet or forest.

After the growth of CNTs 44 on one or more structural fibres 36 and/or on one of more fabric plies 40, the one or more structural fibres 36 and/or the one or more fabric plies 40 may be infused with matrix material 38 so as to form component 12. For the sake of clarity, the description below refers to fabric plies 40 however, it is understood that this description is also applicable in reference to one or more structural fibres 36. For example, subsequent to growing one or more electrically conductive nanostructures 44 on one or two sides of fabric ply 40, the method of producing component 12 may comprise infusing fabric ply 40 with matrix material 38, preforming fabric ply 40 and matrix material 38 combination and then curing the matrix material 38 in order to obtain component 12.

Component 12 may comprise a plurality of fabric plies 40A-40D that may be overlaid and infused with matrix material 38 according to known or other resin infusion processes. One or more of fabric plies 40A-40D may comprise nanostructures extending therefrom. For example, the infusion of matrix material 38 into fabric ply(ies) 40A-40D may be conducted according to resin infusion processes such as resin transfer infusion (RTI), resin transfer molding (RTM), vacuum-assisted resin transfer molding (VARTM), vacuum-assisted resin infusion (VARI) and Seemann composites resin infusion molding process (SCRIMP) for example.

In some cases, the use of structural fibre(s) 36 having nanostructures 44 extending therefrom may be used for "pre-preg" (i.e., using pre-impregnated reinforcement fabrics) in autoclave and/or out-of-autoclave manufacturing processes instead of or in addition to the resin infusion processes listed above. For example, the growing of nanostructures 44 could be conducted on "dry" structural fibres 36 where the matrix material 38 may be subsequently applied to structural fibres 36 by spraying or other suitable method in order to produce pre-impregnated structural fibres 36 in preparation for further processing. The process of applying matrix material 38 in this manner may also be referred to as "prepregging". Accordingly, the growing of nanostructures 44 on structural fibres 36 may be conducted prior to prepregging. In any case, at least some of nanostructures 44 may remain bonded to structural fibres 36 even after infusion (or prepregging) and curing of matrix material 38.

It may be possible to use a range of materials to functionalise (i.e., treat the surface of) CNTs 44 grown on structural fibres 36 depending on the property that is to be enhanced. For instance, oxygen may be used to improve the adhesion between matrix material 38 and CNTs 44 as it may make the CNTs 44 and carbon fibre fabric 40 more polar. Generally, functionalization can be achieved by exposing a sample to a gas (containing the functional material of choice) under thermally elevated, chemical or plasma treatment.

Oxygen functionalizing the carbon structural fibres 36 may improve the dispersability of plastic. Accordingly, when polymer matrix material 38 is infused into the stacked carbon fabric plies 40A-40D, it may be better able to disperse through the stack to reduce the likelihood of forming voids in a composite component 12.

The process of functionalising the material (CNTs 44 grown on structural fibres 36) may be conducted by loading the material into a Plasma Asher Emitech K1050X. Oxygen may then be introduced at a flow rate of 10 sccm (10-15 sccm may be a sensible range) and the radio frequency generated plasma may be set at 30 W. The process may be carried out for 10 seconds (5-10 seconds may be a sensible range). To conclude, the plasma may be terminated, oxygen flow rate may be stopped and then the chamber may be vented to allow the material to be removed.

Alternatively, carbon structural fibres 36 which make up carbon fabric ply 40 may be nitrogen n-doped. Nitrogen treatment of the fuzzy fibres may improve the electrical conductivity of the n-doped material, by injecting more charge carriers. As it will also polarise the material, the hydrophilicity may also improve. Essentially, carbon atoms may be replaced with nitrogen atoms. The nitrogen atoms have an extra electron per atom—the extra electron may contribute to the conductivity of the material. The process of n-doping the material (i.e., fuzzy fibres) may be carried out by first loading the material into a Plasma Asher Emitech K1050X. Nitrogen may be introduced at a flow rate of 10 sccm (10-15 sccm may be a sensible range) and the radio frequency generated plasma may be set at 30 W. The process may be carried out for 10 seconds (5-10 seconds may be a sensible range). To conclude, the plasma may be terminated, nitrogen flow rate may be stopped and then the chamber may be vented to allow the material to be removed.

The growth of CNTs 44 may be controlled via masking of carbon fabric ply 40 prior to the catalyst deposition stage. This may permit greater flexibility in selecting where CNTs 44 or other nanostructures 44 may be grown. For instance, fabric ply 40 could be partially modified/functionalized. For instance, for components that are deemed most susceptible to charge build-up, the location(s) where CNTs 44 are grown on structural fibres 36 may be selected to provide higher electrical conductivity in some regions of component 12 than in others. Accordingly, it may be possible to select the locations of CNTs 44 within component 12 so that a desired circuit may be obtained within component 12.

By functionalising the fuzzy fibres, and thereby controlling polar(hydrophilic) and non-polar (hydrophobic) sections, it may also be possible to alter the fibre-volume ratio in particular sections of component 12.

Example 1

The following describes an exemplary procedure for growing CNTs 44 on carbon fibre using an embodiment of the method disclosed herein.

Figure 6:
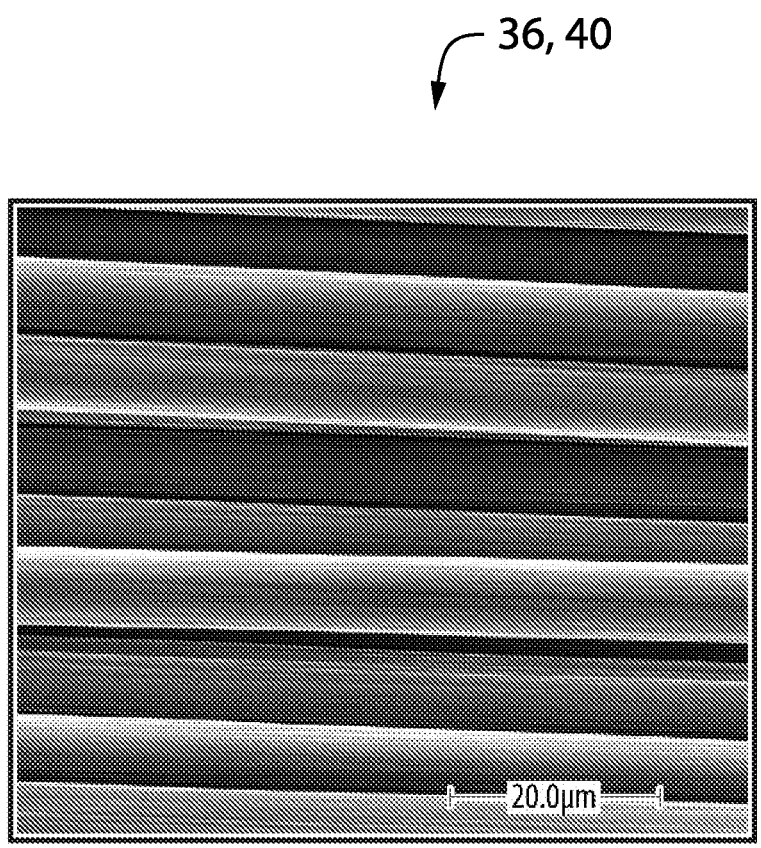
FIG. 6 is an image obtained using a scanning electron microscope (SEM) of exemplary structural fibres that do not have nanostructures extending therefrom.

FIG. 6 is an image obtained using a scanning electron microscope (SEM) of exemplary dry carbon fibres 36 that may be part of a carbon fabric ply 40 prior to the growth of CNTs 44 thereon.

A piece of conventional (i.e. sized) 2/2 twill carbon fabric, where a warp tow crosses two weft tows, was placed in a magnetron sputtering system (JLS MPS 500 DC) and aluminium (Al) was sputter deposited on both sides 41A, 41B of the fabric 40 to a thickness of 35 nm under argon (Ar) gas at a pressure of 2 Torr.

Figure 7:
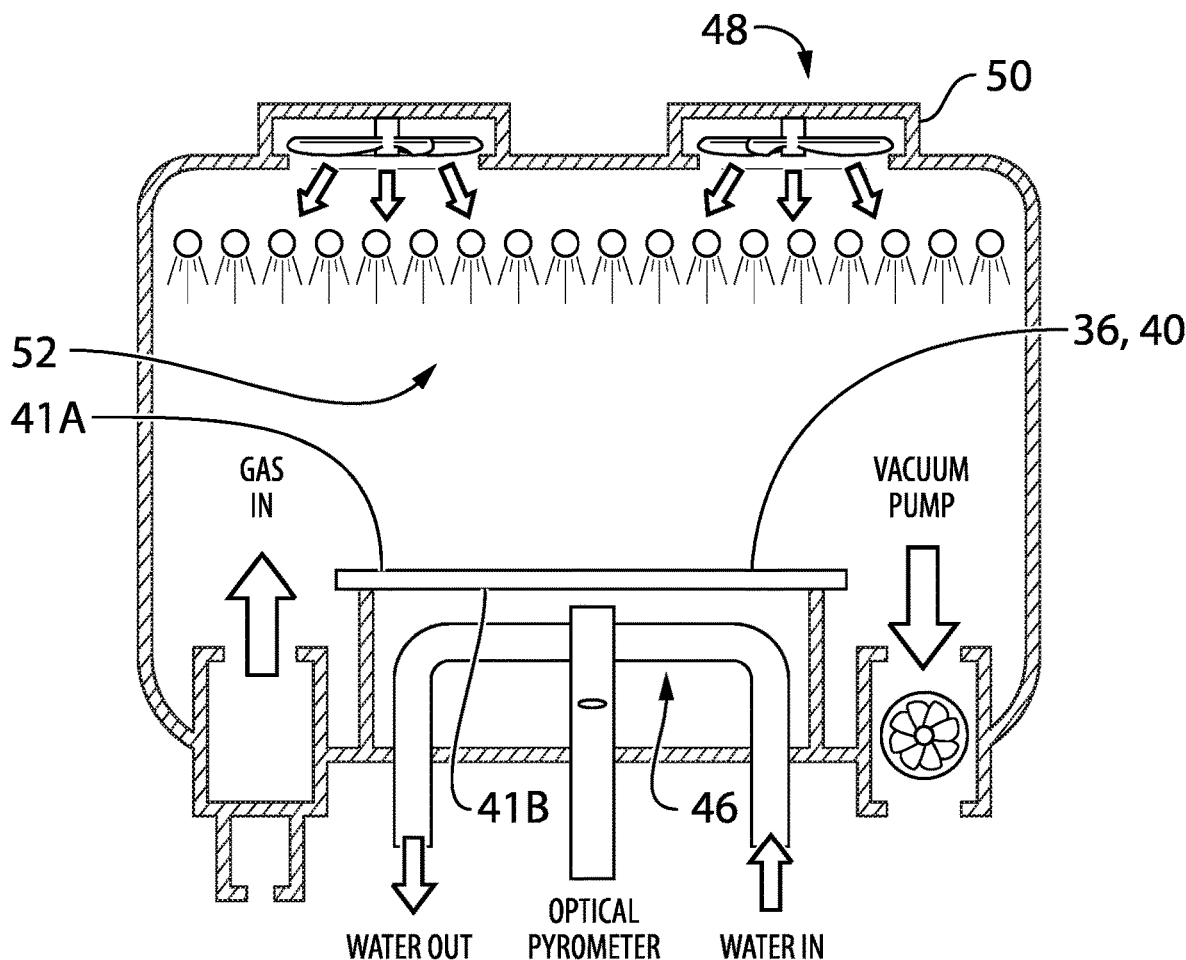
FIG. 7 is a schematic diagram of an exemplary photothermal chemical vapour deposition (PTCVD) system used to grow nanostructures on structural fibres such as those shown in FIG. 6.

The sample was then placed in a sample holder 46 in a photo-thermal chemical vapour deposition (PTCVD) system 48, such as that shown in FIG. 7, and heated to 500° C. under hydrogen gas (H2), which was injected into the system 48 with a flow rate of 100 standard cubic centimetres per minute (sccm) for 15 minutes. This step caused the removal of the polymer sizing.

The sample was then returned to the magnetron sputtering system where iron (Fe) was sputter deposited on the first side 41A of the carbon fabric 40 to a thickness of 4 nm under Ar gas at a pressure of 2 Torr. The fabric 40 was then returned to the sample holder 46 in the PTCVD system 48 with the first side 41A of the carbon fabric 40 face-up. In the time interval that elapsed between the iron being sputter deposited onto the first side 41A of the carbon fabric 40 and the fabric 40 then being placed in the PTCVD system 48 some of the iron oxidised to form iron oxide.

Figure 8:
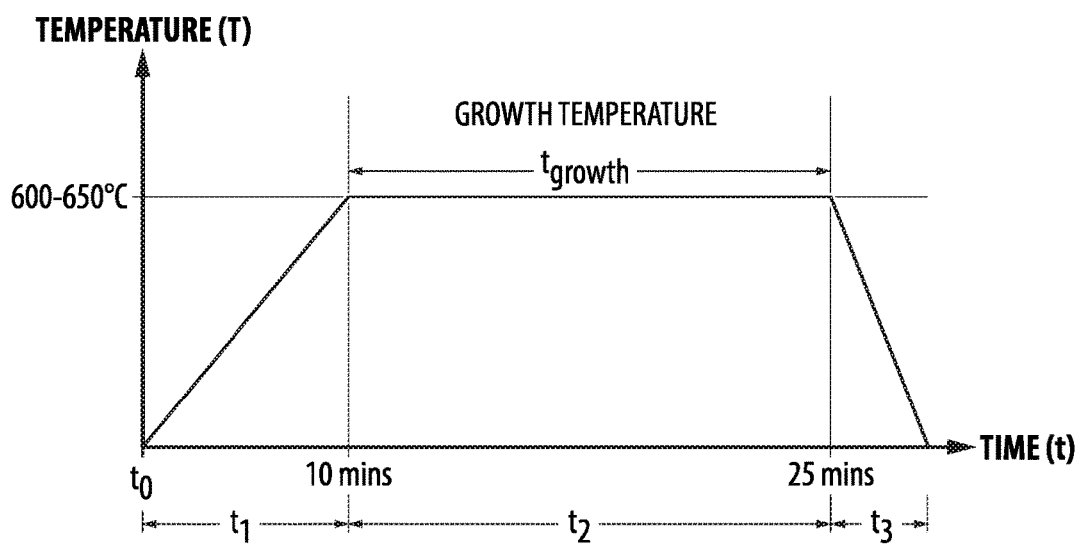
FIG. 8 is a graph showing the process temperature plotted against time during a method for growing of carbon nanotubes (CNTs) on structural fibres.

Heating of the system 48 commenced at time t0, as shown in FIG. 8. In this example, optical heating with a power of 4.8 kW was used with fans 50 and nitrogen gas being employed to cool the optical lamps 52. However, it will be appreciated that other methods could also be used. The system 48 was heated to a temperature of 600-650° C. over a period of ten minutes. Meanwhile the sample holder 46 was water-cooled by a chiller system which maintained the water temperature at 10° C., thus ensuring that the bulk temperature of the sample was lower than the overall temperature of the system 48. During this time the pressure was maintained at 10 Torr and hydrogen gas (H2) was injected into the system 48 with a flow rate of 200 sccm. These conditions caused the iron oxide to be reduced, leaving a layer of substantially pure iron (Fe) on the first side 41A of the fabric 40. The heating and reduction step occurred over the time period t1, as shown in FIG. 8.

After ten minutes, the growth of CNTs 44 started. The temperature was maintained in the range of 60-650° C., the pressure was maintained at 10 Torr, the flow of H2 also remained constant to reduce the overall temperature of the system 48, and the chiller system maintained the water temperature at 10° C. Additionally, acetylene was injected into the system 48 with a flow rate of 50 sccm. The acetylene acted as a carbon source and caused CNTs 44 to grow on the carbon fibres 36 on the first side 41A of the fabric 40. The growth stage lasted for fifteen minutes, as shown by time t2 in FIG. 8.

The length of the CNTs 44 can be dependent upon the duration of the growth stage. In other words, a short growth time would lead to relatively short CNTs 44 and long growth times would lead to relatively long CNTs 44. Accordingly, the length of time the growth stage may be controlled to produce CNTs 44 of a desired length.

Once the growth stage was completed, the optical heating ceased and the sample was allowed to cool. The cooling stage is shown by time t3 and lasted for about 10 minutes. Due to the water-cooling, this process is relatively short in comparison with the use of conventional TCVD systems. For example, the use of water cooling may allow for several growth processes to be carried out in the same period as required for a single growth process using a standard TCVD system.

Once the cooling stage had finished, the sample was again returned to the magnetron sputtering system where Fe was then sputter deposited on a second side 41B of the carbon fabric 40 to a thickness of 4 nm under Ar gas at a pressure of 2 Torr. The fabric was then immediately returned to the sample holder 46 in the photo-thermal chemical vapour deposition (PTCVD) system 48 such that the second side 41B of the carbon fabric 40 was face-up. CNTs 44 were then grown on the second side 41B of the fabric 40 using the same process as set out above.

Figure 9A:
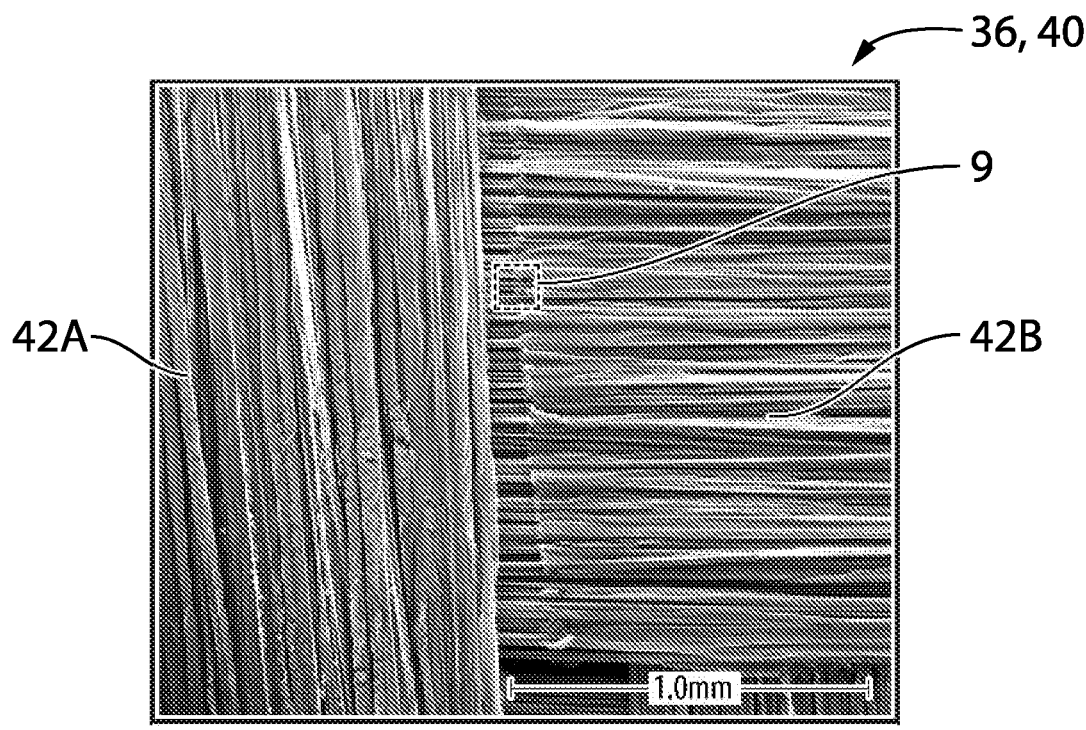
FIG. 9A is an SEM image of a portion of an exemplary fabric ply having CNTs grown thereon according to the present disclosure.
Figure 9B:
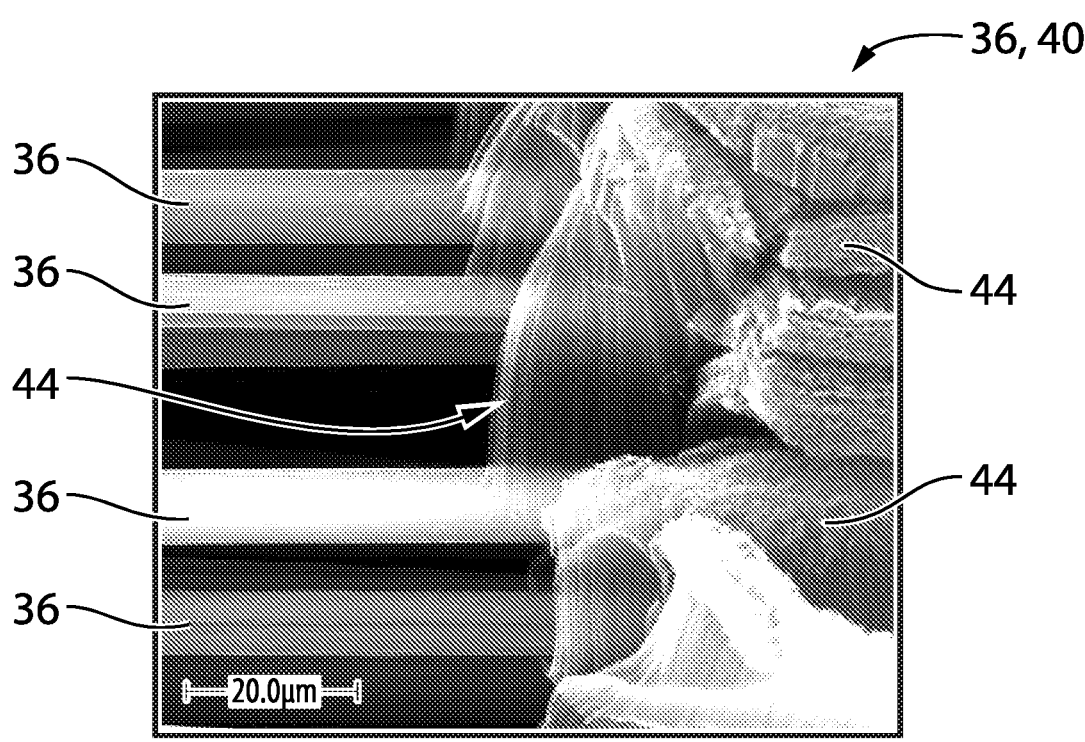
FIG. 9B is a magnified SEM image of the region 9 in FIG. 9A.
Figure 10:
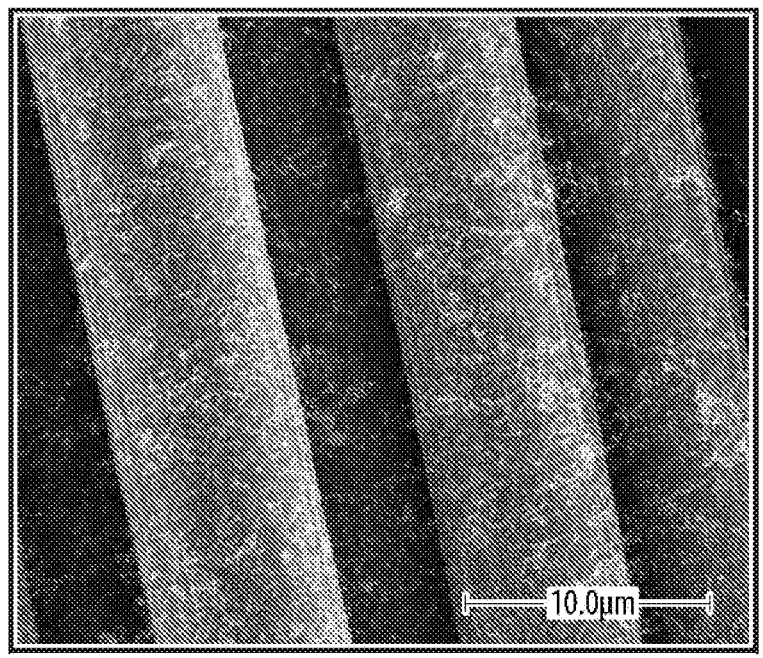
FIG. 10 is an SEM image of a portion of an exemplary fabric ply having CNTs grown thereon according to the prior art.

SEM images showed that the CNTs 44 which grew on the carbon fabric 40 were dense, long and aligned, as can be seen in FIGS. 9A and 9B. FIG. 9B is a magnified SEM image of the region 9 in FIG. 9A. Unlike in the prior art CNTs 44 shown in the SEM image of FIG. 10, the carbon fibres 36 in FIG. 9B are barely visible under the forest of CNTs 44. The left hand side of FIG. 9B shows an area where CNTs 44 have not grown on carbon fibres 36 which form part of tow 42B. The lack of CNTs 44 on the left part of the fibres 36 in FIG. 9B is a result of the warp tow 42A masking the weft tow 42B and emphasises how dense and long the CNTs 44 are which have grown on the rest of the fabric 40 and which are seen on the right hand side of FIG. 9B.

The growth of CNTs 44 resulted in a 5.7% increase in the mass of the carbon fibre fabric 40. Accordingly, it will be understood that the CNTs 44 grown according to the parameters of this example comprise about 5.4% of the total mass of the carbon fabric composite (i.e., component 12).

Figure 11:
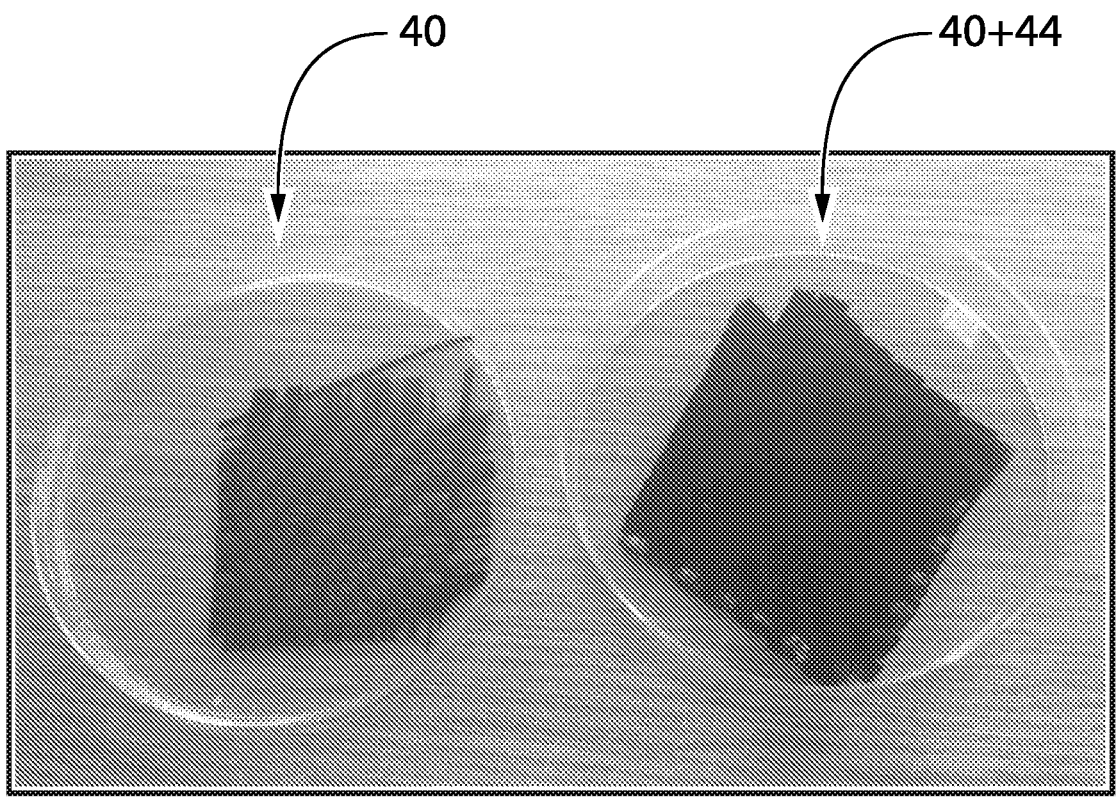
FIG. 11 is a photograph showing two Petri dishes containing samples of carbon fabric where the sample on the left is unprocessed (sized) carbon fabric and the sample on the right is carbon fabric that has CNTs grown thereon in accordance with the present disclosure.

The presence of these CNTs 44 may also provide the carbon fabric 40 structural integrity. The sample on the left of FIG. 11 is a standard carbon fabric 40 without CNTs 44 grown thereon and the sample on the right of FIG. 11 is a fuzzy carbon fabric 40 with CNTs 44 grown thereon in accordance with the above method. It is noted that, unlike the standard carbon fabric 40 on the left, the fuzzy carbon fabric 40+44 retains its shape with the tows 42 running orthogonal/parallel to each other.

Additionally, individual tows 42 were removed from the fabric 40+44 and the fibres 36 remained held in the complete tow 42. This is typically not possible with a sized tow 42 removed from carbon fabric 40. The improved structural integrity may be due to the high density of CNTs 44 grown on the carbon fabric 40. The growth of CNTs 44 also caused the fabric 40 to curl as a result of the van der Waals forces between the CNTs 44.

Additionally, the removal of the epoxy size from the fibres 36 also eliminates one element of the composite which contributes to a reduced glass transition temperature (Tg) in the final composite, potentially a weakening of the thermal stability of the fibre/matrix interface. Additionally, the quality of CNTs 44 grown vastly surpasses the quality that was obtainable using prior art methods. This resulted in more confidence in batch to batch quality, reduction of structural irregularities. This also resulted in more consistent properties for the fuzzy carbon fibre reinforced plastics produced using the methods disclosed herein. The removal (i.e., burning out) of the sizing agent also did not significantly compromise the adhesion of the epoxy resin 38 to structural fibres 36.

Example 2

The following describes exemplary electrical conductivity measurements obtained from component 12, produced in accordance with Example 1 above.

Four pieces of fuzzy carbon fabric 40 made according to the method explained in Example 1 were stacked to make a four-ply structure. The four-ply structure was then infused with a polymer matrix material 38 using a vacuum assisted resin transfer moulding (VARTM) system to make component 12 in accordance with the present disclosure (see CNTs 44 shown in FIG. 9B). Two other baseline components were produced for comparison with component 12 (referred to as "w/ present CNTs"). The first baseline component (referred to as "w/o CNTs") was produced similarly but using carbon fabric without any CNTs grown thereon. The second baseline component (referred to as "w/ prior art CNTs") was also produced similarly but using carbon fabric having CNTs grown thereon according to a prior art method (see CNTs shown in FIG. 10).

Figure 12:
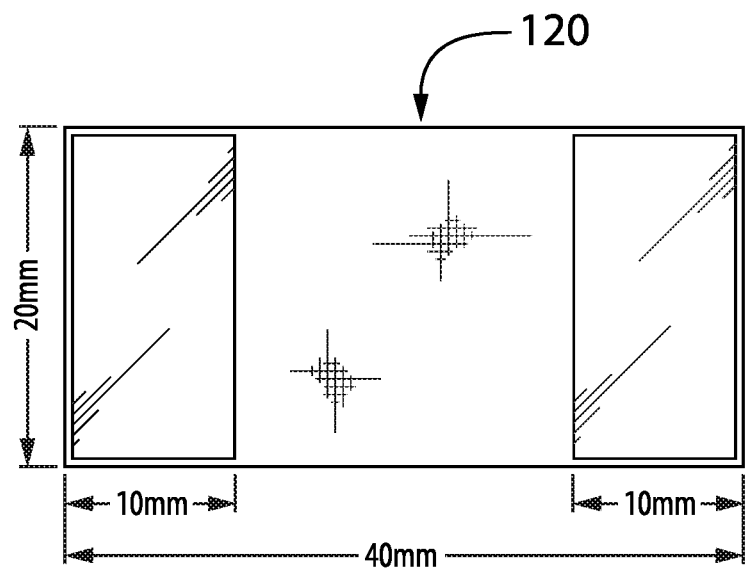
FIG. 12 is a schematic view of an exemplary component having Silver DAG applied thereto for measuring electrical conductivity.

An electrically conductive paint, sometimes referred to as "Silver DAG" was applied to 10 mm-wide end portions on the first side and on the second, opposite side of each sample 120 to provide electrical contact points for the purpose of measuring electrical conductivity. A view of one first side of a sample 120 with Silver DAG applied thereon is shown in FIG. 12. The different configurations for obtaining electrical conductivity measurements are shown in FIG. 13.

Figure 13:
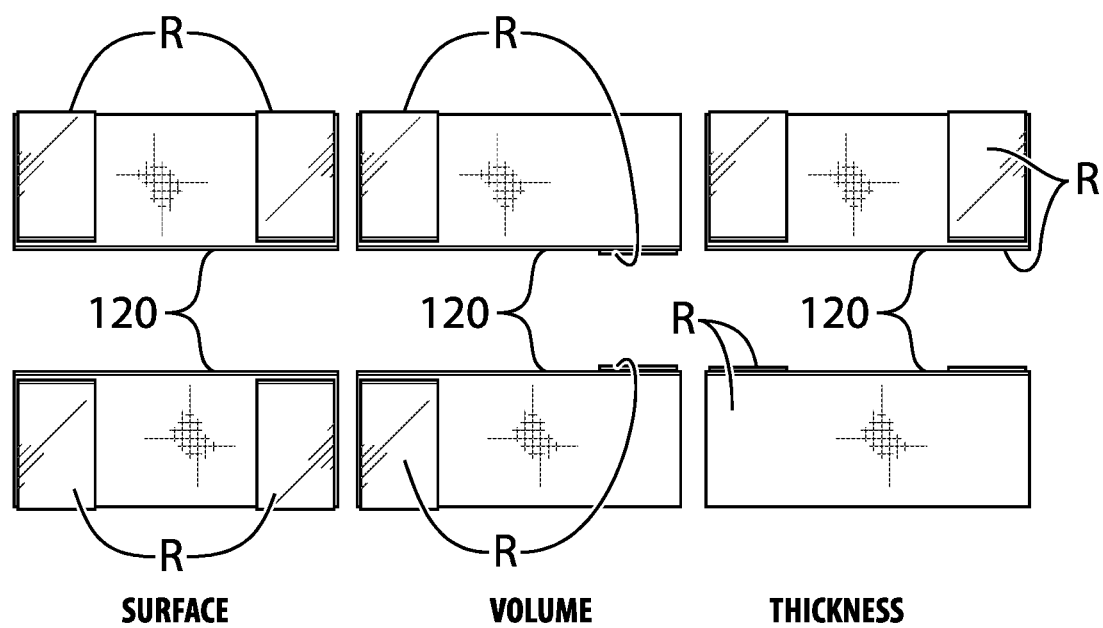
FIG. 13 illustrate a plurality of configurations for obtaining electrical conductivity measurements on the component of FIG. 12.
Figure 14:
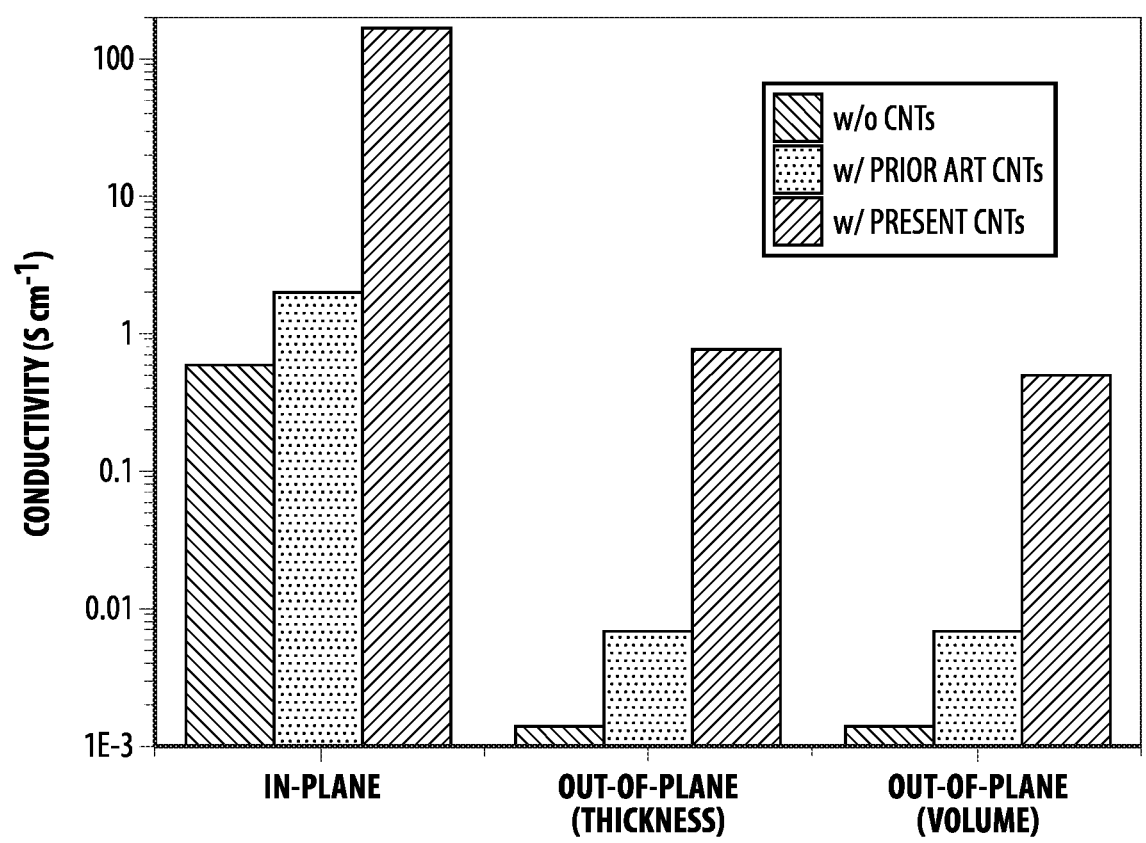
FIG. 14 shows a graphical representation of electrical conductivity measurements obtained using the configurations shown in FIG. 13 on the component of FIG. 12 and two other baseline components.

The electrical conductivity of the surface, volume and thickness of each sample 120 was then measured by attaching a Keithley 4200 parameter analyser with two needle probes to the areas where the Silver DAG had been applied, as shown in FIG. 13. The numerical values for electrical conductivity of the surface, volume and thickness are represented in the graph of FIG. 14 and are listed in the table below.

| Measurement Type | w/o CNTs | w/prior art CNTs | w/present CNTs |
|---|---|---|---|
| In-Plane | 0.61 S cm$^{-1}$ | 2 S cm$^{-1}$ | 167 S cm$^{-1}$ |
| Out-of-Plane (Thickness) | 0.0014 S cm$^{-1}$ | 0.007 S cm$^{-1}$ | 0.763 S cm$^{-1}$ |
| Out-of-Plane (Volume) | 0.0014 S cm$^{-1}$ | 0.0069 S cm$^{-1}$ | 0.496 S cm$^{-1}$ |

Given the greatly improved conductivity of the sample having CNTs 44 grown according to the present disclosure (i.e., "w/ present CNTs"), the only way that the data could be meaningfully compared to the baseline samples (i.e., "w/o CNTs" and "w/ prior art CNTs") was by plotting the values on a graph with a logarithmic scale. It is observed that the electrical conductivity of the sample having CNT's grown according to the present disclosure (i.e., "w/ present CNTs") is over one hundred times more electrically conductive than the baseline sample without any CNTs (i.e., "w/o CNTs") and nearly one hundred times more conductive than the prior art sample containing CNTs grown according to the prior art (i.e., "w/ prior art CNTs") for all three measurement configurations.

The baseline samples (i.e., "w/o CNTs" and "w/ prior art CNTs") only really have any degree of electrical conductivity across the surface (i.e., in-plane). Accordingly, these materials can be described as two-dimensional anisotropic materials. However, the sample having CNTs 44 grown according to the present disclosure (i.e., "w/ present CNTs") not only exhibits enhanced electrical conductivity across its surface but also exhibits electrical conductivity across its thickness and volume. Accordingly, CNTs 44 grown according to the present disclosure caused the material of component 12 to become more isotropic where the CNTs 44 formed electrical percolation pathways between carbon structural fibres 36.

FIG. 15 shows a plot illustrating exemplary changes in mass of a sample of fabric ply 40 as it undergoes the various steps described above. In the specific example represented in FIG. 15, the growth of CNTs 44 on one side of fabric ply 40 resulted in a 1.15% increase in mass and the growth of CNTs 44 on both sides of fabric ply 40 is estimated to represent a 2.24% increase in mass.

The methods described above or parts thereof may also be used for growing CNT forests onto substrates other than structural fibres 36. For example, the methods described above may be used to grow CNT forests on: copper mesh of different aerial weight like those typically used in aerospace applications; mesh or sheets of aggregated CNTs sometime referred to as "Buckypaper"; silver and silver coated meshes; veils, meshes, grids and perforated sheets made of thermoplastics having relatively high melting temperatures; non-woven veils made of the materials mentioned above or other materials; and non-crimp fabrics which have been stitched with yarns (e.g. carbon, fiberglass, metal wires) that can withstand relatively high temperatures.

For example, some fibre-reinforced composite components that are used for aerospace applications may comprise heavy copper mesh to increase electrical conductivity in some areas of such components. For the case of aircraft wing skins, such heavy copper mesh may be disposed near fasteners for example. In some cases the methods disclose herein may be used to incorporate electrically nanostructures 44 in fibre-reinforced composite components for aerospace applications to potentially eliminate or reduced the amounts of such heavy copper mesh required in such components.

Example 3

The following describes measurements of density of CNTs 44 in an exemplary component 12 produced in accordance with Example 1 above.

Figure 16A:
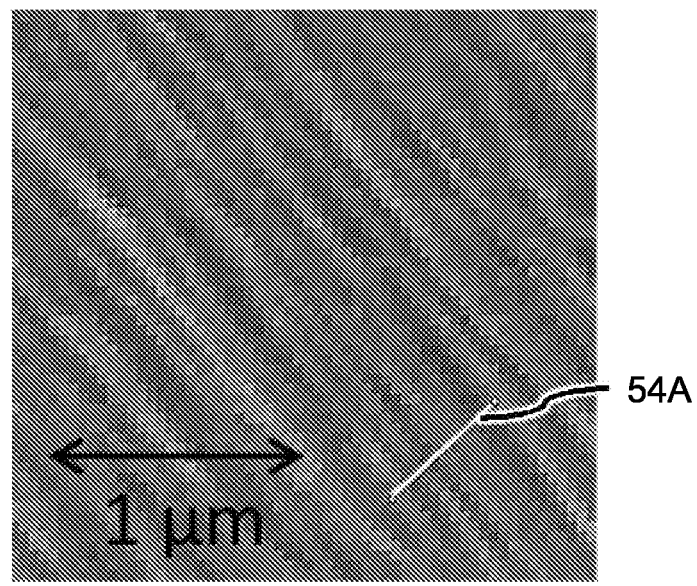
FIGS. 16A and 16B are high magnification images of different regions of an exemplary fibre-reinforced component for measuring densities of CNTs.
Figure 16B:
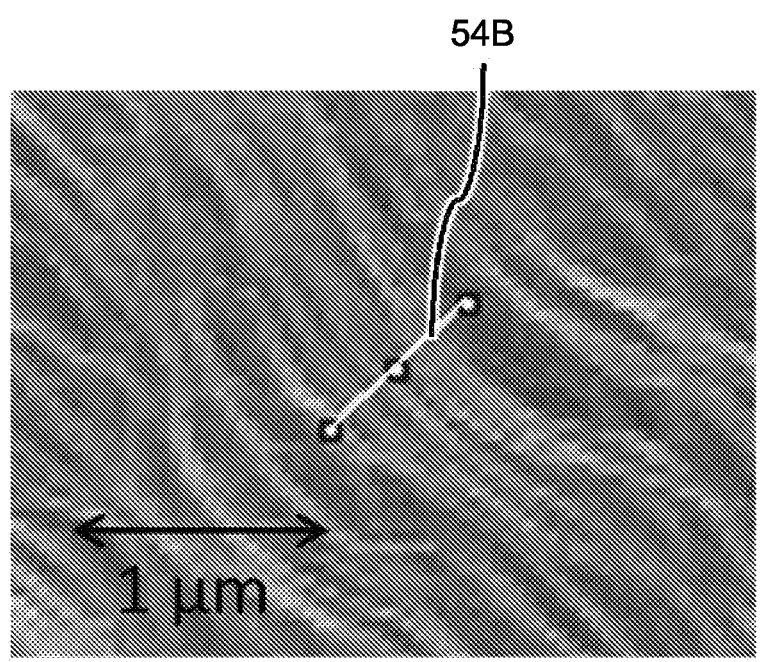

FIGS. 16A and 16B are high-magnification images of different regions of component 12 which permitted CNTs 44 to be resolved. Lines 54A and 54B were drawn substantially perpendicular to the lengths of the CNTs 44 and the CNTs 44 crossing lines 54A and 54B were counted. The length of lines 54A and 54B and the number of CNTs 44 crossing lines 54A and 54B allowed the density of CNTs 44 to be estimated in each micrograph. Using line 54A in FIG. 16A, the density of CNTs 44 was estimated to be about $1.7 \times 10^{10}$ CNTs/cm$^2$. Using line 54B in FIG. 16B, the density of CNTs 44 was estimated to be about $1.8 \times 10^{10}$ CNTs/cm$^2$. The density of CNTs 44 in these particular regions of component 12 ranged from about $1 \times 10^{10}$ CNTs/cm$^2$ to about $2 \times 10^{10}$ CNTs/cm$^2$.

Example 4

The following describes measurements of diameters of CNTs 44 in an exemplary component 12 produced in accordance with Example 1 above.

Figure 17:
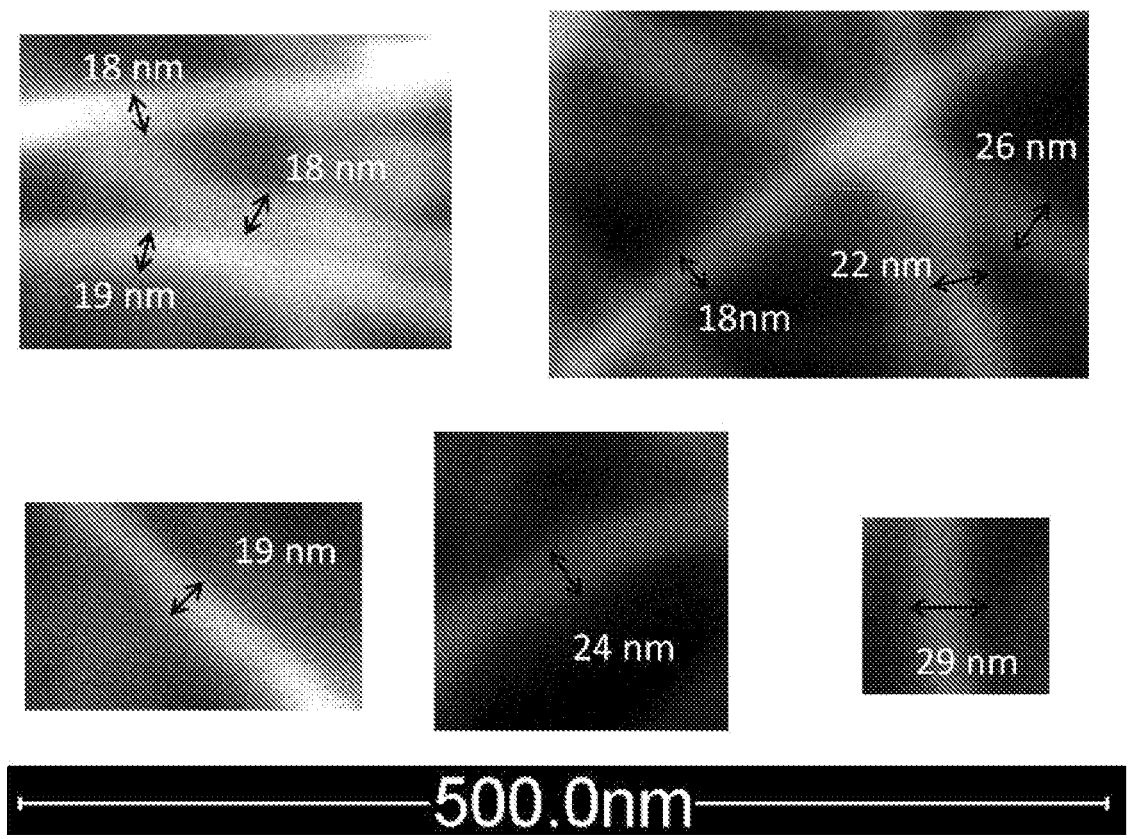
FIG. 17 shows a plurality of a high-magnification images of different regions of an exemplary fibre-reinforced component for measuring the diameters of CNTs.

FIG. 17 shows a plurality of a high-magnification images of different regions of component 12 obtained using a scanning electron microscope (SEM) where individual CNTs 44 could be resolved. There was some "edge effect" visible in these images due to the emission of secondary electrons being elevated. Nevertheless, the diameters of CNTs 44 in these particular regions of component 12 ranged between about 18 nm to about 29 nm.

Figure 18:
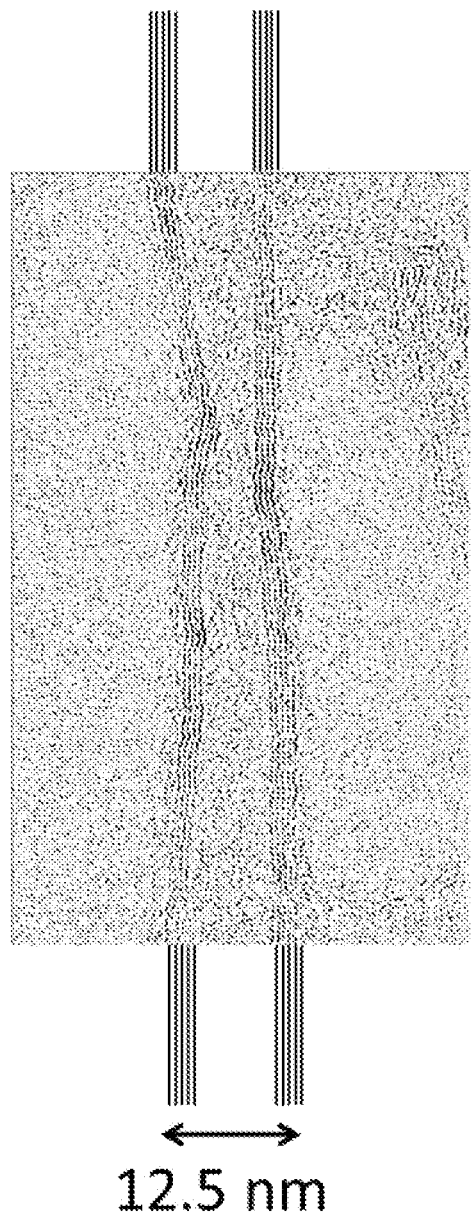
FIG. 18 is a scanning transmission electron microscopy image of a single CNT in an exemplary fibre-reinforced component.

FIG. 18 shows a scanning transmission electron microscopy image of a single CNT 44 from component 12. The axial length of CNT 44 has been extrapolated above and below the image for clarity. The diameter of CNT 44 measured using this image was about 12.5 nm. The images shown in FIGS. 17 and 18 suggest that the diameters of CNTs 44 are between about 10 nm to about 30 nm.

Example 5

The following describes measurements of lengths of CNTs 44 in an exemplary component 12 produced in accordance with Example 1 above.

Figure 19:
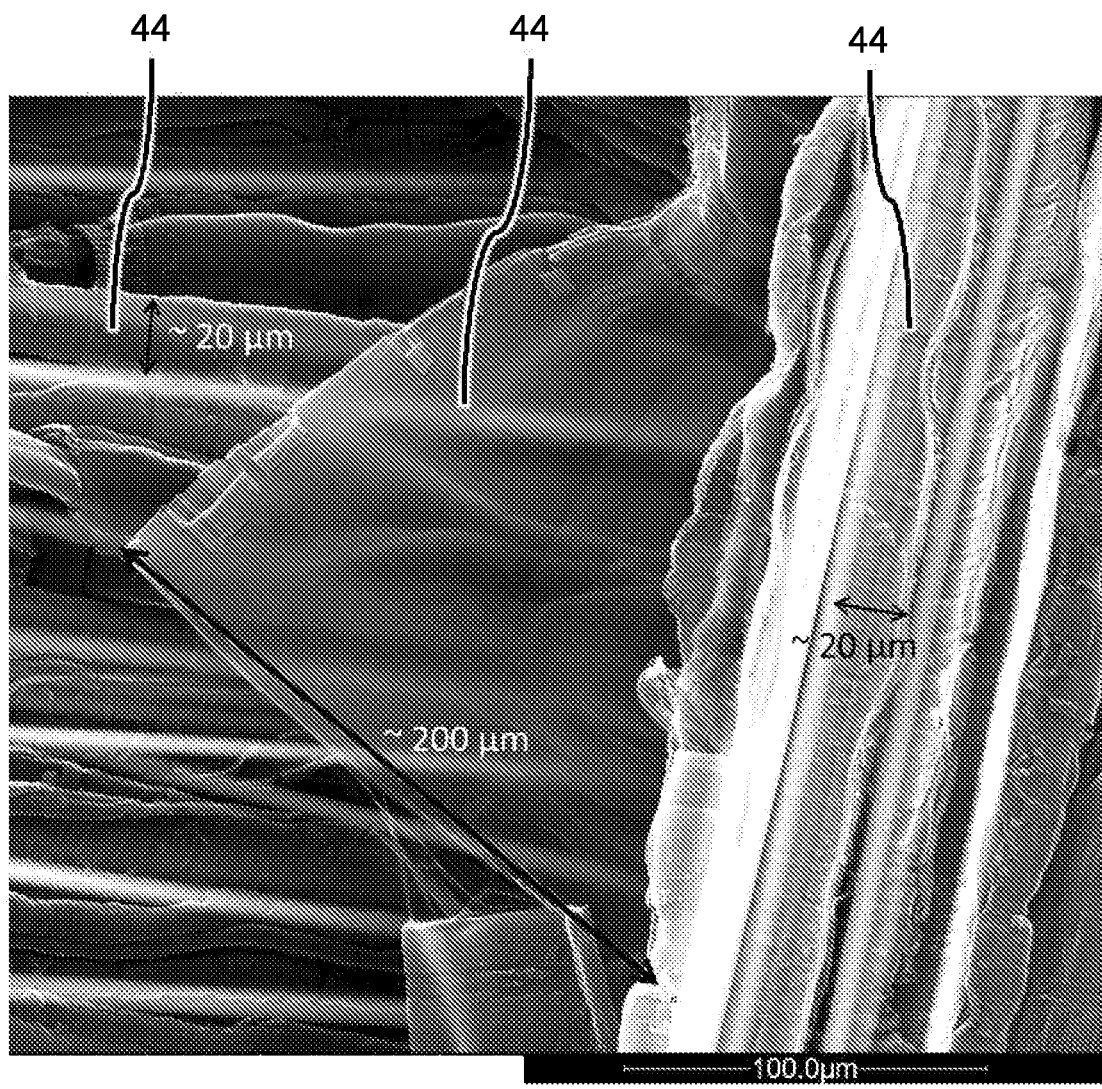
FIG. 19 is a high-magnification image of a forest of CNTs in an exemplary fibre-reinforced component.

FIG. 19 shows a high-magnification image of an exemplary region of component 12 obtained using a scanning electron microscope (SEM) where a forest of CNTs 44 could be resolved. The image shows that CNTs 44 may grow to a length of up to about 200 µm in some cases. The image also shows that CNTs 44 may generally have a length of about 10 µm to about 50 µm.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the components and methods disclosed and shown herein may comprise a specific number of elements, the components and methods disclosed could be modified to include additional or fewer of such elements. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A civil aviation component having a fibre-reinforced composite structure, the component comprising:
   a plurality of structural fibres embedded in a cured matrix material; and
   a plurality of nanostructures extending from each of the structural fibres, a density of the nanostructures being at least about $10^7$ nanostructures per cm$^2$ of area of a surface of the structural fibres, wherein the nanostructures extend from both sides of the structural fibres;
   wherein the matrix material is doped with graphene.

2. The component as defined in claim 1, wherein the density of nanostructures extending from the one or more structural fibres is between about $10^9$ and about $10^{11}$ nanostructures per $cm^2$ of surface area.

3. The component as defined in claim 1, wherein the nanostructures comprise carbon nanotubes.

4. The component as defined in claim 1, wherein the one or more structural fibres are free of a sizing agent.

5. The component as defined in claim 1, wherein:
the component comprises an outer surface;
the plurality of structural fibres comprise an outer fibre proximal to the outer surface and an inner fibre distal from the outer surface; and
the nanostructures extend from the outer fibre but not from the inner fibre.

6. The component as defined in claim 1, wherein the one or more structural fibres are part of a fabric ply and the nanostructures extend only from one side of the fabric ply.

7. The component as defined in claim 1, wherein the structural fibres comprise an outer fabric ply proximate an outer surface of the component and an inner fabric ply distal from the outer surface of the component.

8. The component as defined in claim 7, wherein the nanostructures extend only from the outer fabric ply.

9. The component as defined in claim 7, wherein the nanostructures extend from only an outer side of the outer fabric ply.

10. The component as defined in claim 7, wherein the nanostructures extend from both the outer fabric ply and the inner fabric ply.

11. The component as defined in claim 10, wherein the nanostructures are disposed between the outer fabric ply and the inner fabric ply.

12. The component as defined in claim 1, wherein the one or more structural fibres are part of a fabric ply and the nanostructures form at least 1% of the mass of the fabric ply.

13. The component as defined in claim 1, wherein the density of the nanostructures is non-uniform along a length or width of the component.

14. An aircraft comprising the component as defined in claim 1.

15. An aircraft wing skin comprising the component as defined in claim 1.

16. The aircraft wing skin as defined in claim 15, wherein the density of the nanostructures at one location on the wing skin is higher than in another location on the wing skin.

17. A civil aviation component having a fibre-reinforced composite structure, the component comprising:
a plurality of structural fibres embedded in a cured matrix material, the plurality of structural fibres comprising an outer fibre proximal to an outer surface of the component and an inner fibre distal from the outer surface; and
a plurality of nanostructures extending from the outer fibre and not from the inner fibre,
wherein a density of nanostructures extending from the outer fibre is at least $10^7$ nanostructures per $cm^2$ of surface area of structural fibre,
wherein the nanostructures extend from both sides of the outer fibre; and
wherein the matrix material is doped with graphene.

18. A civil aviation component having a fibre-reinforced composite structure, the component comprising:
a plurality of structural fibres embedded in a cured matrix material; and
a plurality of nanostructures extending from each of the structural fibres, the structural fibres from which the nanostructures extend being free of a sizing agent,
wherein a density of nanostructures extending from the structural fibres is at least $10^7$ nanostructures per $cm^2$ of surface area of structural fibres,
wherein the nanostructures extend from both sides of the structural fibres; and
wherein the matrix material is doped with graphene.

19. The component as defined in claim 18, wherein the one or more structural fibres are part of a fabric ply and the nanostructures form at least 1% of the mass of the fabric ply.

* * * * *